US010701573B2

(12) United States Patent
Jia

(10) Patent No.: US 10,701,573 B2
(45) Date of Patent: Jun. 30, 2020

(54) TRAFFIC STATISTICS COLLECTION METHOD AND APPARATUS, AND TERMINAL DEVICE

(71) Applicant: Huawei Technologies Co., Ltd., Shenzhen, Guangdong (CN)

(72) Inventor: Yinyuan Jia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 340 days.

(21) Appl. No.: 15/566,395

(22) PCT Filed: Apr. 15, 2015

(86) PCT No.: PCT/CN2015/076655
§ 371 (c)(1),
(2) Date: Oct. 13, 2017

(87) PCT Pub. No.: WO2016/165088
PCT Pub. Date: Oct. 20, 2016

(65) Prior Publication Data
US 2018/0146386 A1  May 24, 2018

(51) Int. Cl.
H04W 24/08 (2009.01)
H04L 12/26 (2006.01)
H04W 84/04 (2009.01)

(52) U.S. Cl.
CPC ............. *H04W 24/08* (2013.01); *H04L 43/04* (2013.01); *H04L 43/08* (2013.01); *H04W 84/042* (2013.01)

(58) Field of Classification Search
None
See application file for complete search history.

(56) References Cited

U.S. PATENT DOCUMENTS 9,408,104 B1 * 8/2016 Vivanco ............ H04W 28/0205
2008/0273471 A1   11/2008 Huang et al.
2015/0009874 A1 * 1/2015 Edara ................ H04W 52/0225
                                                                370/311
(Continued)

FOREIGN PATENT DOCUMENTS

CN  101005381 A  7/2007
CN  101035170 A  9/2007
(Continued)

OTHER PUBLICATIONS

Office Action issued in Chinese Application No. 201580078871.8 dated May 25, 2019, 10 pages (With English translation).

*Primary Examiner* — Gregory B Sefcheck
*Assistant Examiner* — Srinivasa R Reddivalam
(74) *Attorney, Agent, or Firm* — Fish & Richardson P.C.

(57) ABSTRACT

The embodiments of the present invention are used in a traffic statistics collection process. A traffic statistics collection method includes: when a modem detects a first IP packet, obtaining a first IP address of the first IP packet, and obtaining a packet length of the first IP packet; obtaining, from an in-memory database, an APN corresponding to the first IP address of the first IP packet; and when the APN corresponding to the first IP address of the first IP packet is an APN of a first PDN, adding the packet length of the first IP packet to a first statistics value of VoLTE traffic, where the first PDN is a PDN required by a bearer that establishes a VoLTE service.

16 Claims, 8 Drawing Sheets

(56) References Cited

U.S. PATENT DOCUMENTS

| | | | |
|---|---|---|---|
| 2015/0092540 A1* | 4/2015 | Choudhary | H04W 28/0289 370/230 |
| 2015/0195174 A1 | 7/2015 | Kogami | |
| 2016/0212648 A1 | 7/2016 | Xu et al. | |

FOREIGN PATENT DOCUMENTS

| | | |
|---|---|---|
| CN | 101222383 A | 7/2008 |
| CN | 103428754 A | 12/2013 |
| CN | 104022920 A | 9/2014 |
| JP | 2014027534 A | 2/2014 |
| WO | 2011143989 A1 | 11/2011 |
| WO | 2014021069 A1 | 2/2014 |

\* cited by examiner

TRAFFIC STATISTICS COLLECTION METHOD AND APPARATUS, AND TERMINAL DEVICE

CROSS-REFERENCE TO RELATED APPLICATIONS

This application is a national stage of International Application No. PCT/CN2015/076655, filed on Apr. 15, 2015, which is hereby incorporated by reference in its entirety.

TECHNICAL FIELD

The present invention relates to the communications field, and in particular, to a traffic statistics collection method and apparatus, and a terminal device.

BACKGROUND

With social development, it is becoming increasingly popular to access the Internet by using a mobile phone. Traffic is generated when a user accesses the Internet by using a mobile phone. The traffic generated during access to the Internet may be obtained by using a traffic statistics collection function built in a system of the mobile phone or obtained through statistics collection by using third-party software installed on the mobile phone, making it convenient for the user to query the traffic.

In the prior art, because a protocol stack used for a data service is deployed on an application processor (Application processor, AP) side of a mobile phone, during statistics collection of traffic generated during access of a user to the Internet, a traffic statistics collection function built in a system of the mobile phone and third-party software installed on the mobile phone are both implemented based on the AP of the mobile phone. That is, the AP of the mobile phone may collect statistics about the traffic generated during access to the Internet, and present the traffic to the user by using the traffic statistics collection function built in the system of the mobile phone or the third-party software installed on the mobile phone. It is well known that a Long Term Evolution (Long Term Evolution, LTE) network emerges as mobile communications technologies develop. The LTE network can provide users with high-speed data services and can also provide users with high-quality audio-video services by using a voice over LTE (English: Voice Over LTE, VoLTE for short) technology. In this case, traffic is generated when a user makes an audio-video call by using the LTE network.

However, a protocol stack used for the audio-video service is usually not deployed on the AP side of the mobile phone. As a result, statistics about the traffic generated when the user makes the audio-video call by using the LTE network cannot be collected.

SUMMARY

The present invention provides a traffic statistics collection method and apparatus, and a terminal device, so as to resolve a problem that statistics about traffic generated when a user makes an audio-video call by using an LTE network cannot be collected.

According to a first aspect of the present invention, a traffic statistics collection method is provided, including:

when a modem detects a first Internet Protocol IP packet, obtaining a first IP address of the first IP packet, and obtaining a packet length of the first IP packet;

obtaining, by the modem from an in-memory database, an access point name APN corresponding to the first IP address of the first IP packet; and when the APN corresponding to the first IP address of the first IP packet is an APN of a first public data network PDN, adding, by the modem, the packet length of the first IP packet to a first statistics value of voice over Long Term Evolution LTE VoLTE traffic, where the first PDN is a PDN required by a bearer that establishes a VoLTE service.

With reference to the first aspect, in a first possible implementation, before the detecting, by a modem, a first Internet Protocol IP packet, the method further includes:

obtaining, by the modem, an IP address of the first PDN; and storing, by the modem, the IP address of the first PDN and the APN of the first PDN corresponding to each other in the in-memory database.

With reference to the first aspect or the foregoing possible implementation, in another possible implementation, the method further includes:

obtaining, by the modem, a second statistics value of the VoLTE traffic that is obtained through statistics collection by an application processor AP; and adding, by the modem, the second statistics value of the VoLTE traffic to the first statistics value of the VoLTE traffic.

With reference to the first aspect or the foregoing possible implementations, in another possible implementation, the obtaining, by the modem, a second statistics value of the VoLTE traffic that is obtained through statistics collection by an application processor AP includes:

receiving, by the modem, the second statistics value of the VoLTE traffic that is sent by the AP; or querying, by the modem, traffic data obtained through statistics collection by the AP, to obtain the second statistics value of the VoLTE traffic.

With reference to the first aspect or the foregoing possible implementations, in another possible implementation, the obtaining, by the modem, an IP address of the first PDN includes:

sending, by the modem, a first PDN registration request to a network side, where the first PDN registration request includes the APN of the first PDN, so that the network side obtains the IP address of the first PDN according to the APN of the first PDN; and receiving, by the modem, the IP address of the first PDN that is sent by the network side.

With reference to the first aspect or the foregoing possible implementations, in another possible implementation, the method further includes:

determining, by the modem, whether the first statistics value of the VoLTE traffic is greater than or equal to a limiting value of the VoLTE traffic; and when the first statistics value of the VoLTE traffic is greater than or equal to the limiting value of the VoLTE traffic, transmitting, by the modem, a VoLTE service according to a handover policy, where the VoLTE service is a VoLTE voice service or a VoLTE video service.

With reference to the first aspect or the foregoing possible implementations, in another possible implementation, before the transmitting, by the modem, a VoLTE service according to a handover policy, the method further includes:

receiving, by the modem, the handover policy sent by the AP, where the handover policy is sent by the AP after the AP receives a selection trigger of a user for the handover policy.

With reference to the first aspect or the foregoing possible implementations, in another possible implementation, the handover policy is: when the first statistics value of the VoLTE traffic is greater than or equal to the limiting value of the VoLTE traffic, transmission of the VoLTE voice service and transmission of the VoLTE video service are both unrestricted; and the transmitting, by the modem, a VoLTE service according to a handover policy includes:

when the VoLTE service is the VoLTE voice service, transmitting, by the modem, collected voice data by using an LTE network; and when the VoLTE service is the VoLTE video service, transmitting, by the modem, collected voice data and image data by using the LTE network.

With reference to the first aspect or the foregoing possible implementations, in another possible implementation, the handover policy is: when the first statistics value of the VoLTE traffic is greater than or equal to the limiting value of the VoLTE traffic, transmission of the VoLTE voice service is unrestricted, and transmission of the VoLTE video service is restricted; and the transmitting, by the modem, a VoLTE service according to a handover policy includes:

when the VoLTE service is the VoLTE voice service, transmitting, by the modem, collected voice data by using an LTE network; and when the VoLTE service is the VoLTE video service, switching, by the modem, a video mode to a voice mode, and transmitting collected voice data by using the LTE network.

With reference to the first aspect or the foregoing possible implementations, in another possible implementation, the handover policy is: when the first statistics value of the VoLTE traffic is greater than or equal to the limiting value of the VoLTE traffic, transmission of the VoLTE voice service and transmission of the VoLTE video service are both restricted; and the transmitting, by the modem, a VoLTE service according to a handover policy includes:

when the VoLTE service is the VoLTE voice service, performing, by the modem, a handover from an LTE network to a 2nd generation mobile communications technology 2G/3rd generation mobile communications technology 3G network, and transmitting collected voice data by using a circuit switched CS domain or a packet switched PS domain; and when the VoLTE service is the VoLTE video service, switching, by the modem, a video mode to a voice mode, and transmitting collected voice data by using the CS domain or the PS domain.

With reference to the first aspect or the foregoing possible implementations, in another possible implementation, the handover policy is: when the first statistics value of the VoLTE traffic is greater than or equal to the limiting value of the VoLTE traffic, reducing a codec rate of the VoLTE voice service, and reducing a transmission parameter of the VoLTE video service; and the transmitting, by the modem, a VoLTE service according to a handover policy includes:

when the VoLTE service is the VoLTE voice service, reducing, by the modem, a codec rate of collected voice data; and when the VoLTE service is the VoLTE video service, reducing, by the modem, a transmission parameter of collected video data, where the transmission parameter of the video data includes one or more of the following: resolution of image data in the video data, a frame rate of image data in the video data, or a codec rate of voice data in the video data.

According to a second aspect of the present invention, a traffic statistics collection method is provided, including:

when an application processor AP detects a second Internet Protocol IP packet, obtaining a second IP address of the second IP packet, and obtaining a packet length of the second IP packet;

obtaining, by the AP from an in-memory database, an access point name APN corresponding to the second IP address of the second IP packet; and when the APN corresponding to the second IP address of the second IP packet is an APN of a first public data network PDN, adding, by the AP, the packet length of the second IP packet to a second statistics value of voice over Long Term Evolution LTE VoLTE traffic, where the first PDN is a PDN required by a bearer that establishes a VoLTE service.

With reference to the second aspect, in a possible implementation, the method further includes:

obtaining, by the AP, a first statistics value of the VoLTE traffic that is obtained through statistics collection by a modem;

adding, by the AP, the first statistics value of the VoLTE traffic to the second statistics value of the VoLTE traffic; and displaying, by the AP, the second statistics value of the VoLTE traffic to a user.

With reference to the second aspect or the foregoing possible implementations, in another possible implementation, the obtaining, by the AP, a first statistics value of the VoLTE traffic that is obtained through statistics collection by a modem includes:

receiving, by the AP, the first statistics value of the VoLTE traffic that is sent by the modem; or querying, by the AP, traffic data obtained through statistics collection by the modem, to obtain the first statistics value of the VoLTE traffic.

With reference to the second aspect or the foregoing possible implementations, in another possible implementation, the method further includes:

when the APN corresponding to the second IP address of the second IP packet is an APN of a second PDN, adding, by the AP, the packet length of the second IP packet to a statistics value of data traffic, where the second PDN is a PDN required by a bearer that establishes a data service; and displaying, by the AP, the statistics value of the data traffic to the user.

With reference to the second aspect or the foregoing possible implementations, in another possible implementation, before the detecting, by an application processor AP, a second Internet Protocol IP packet, the method further includes:

obtaining, by the AP, an IP address of the second PDN; and storing, by the AP, the IP address of the second PDN and the APN of the second PDN corresponding to each other in the in-memory database.

With reference to the second aspect or the foregoing possible implementations, in another possible implementation, the obtaining, by the AP, an IP address of the second PDN includes:

sending, by the AP, a second PDN registration request to a network side by using the modem, where the second PDN registration request includes the APN of the second PDN, so that the network side obtains the IP address of the second PDN according to the APN of the second PDN; and receiving, by the AP, the IP address of the second PDN that is sent by the network side by using the modem.

According to a third aspect of the present invention, a traffic statistics collection method is provided, including:

when an application processor AP detects a second Internet Protocol IP packet, obtaining a packet length of the second IP packet;

adding, by the AP, the packet length of the second IP packet to a statistics value of traffic;

obtaining, by the AP, a first statistics value of voice over Long Term Evolution LTE VoLTE traffic that is obtained through statistics collection by a modem; and adding, by the AP, the first statistics value of the VoLTE traffic to the statistics value of the traffic.

With reference to the third aspect, in a possible implementation, the obtaining, by the AP, a first statistics value of voice over Long Term Evolution LTE VoLTE traffic that is obtained through statistics collection by a modem includes:

receiving, by the AP, the first statistics value of the VoLTE traffic that is sent by the modem; or querying, by the AP, traffic data obtained through statistics collection by the modem, to obtain the first statistics value of the VoLTE traffic.

According to a fourth aspect of the present invention, a traffic statistics collection apparatus is provided, including:

an obtaining unit, configured to: when a first Internet Protocol IP packet is detected, obtain a first IP address of the first IP packet, obtain a packet length of the first IP packet, and obtain, from an in-memory database, an access point name APN corresponding to the first IP address of the first IP packet; and an addition unit, configured to: when the APN that corresponds to the first IP address of the first IP packet and that is obtained by the obtaining unit is an APN of a first public data network PDN, add the packet length of the first IP packet to a first statistics value of voice over Long Term Evolution LTE VoLTE traffic, where the first PDN is a PDN required by a bearer that establishes a VoLTE service.

With reference to the fourth aspect, in a possible implementation, the obtaining unit is further configured to obtain an IP address of the first PDN before the first Internet Protocol IP packet is detected; and the apparatus further includes:

a storage unit, configured to store the IP address of the first PDN that is obtained by the obtaining unit and the APN of the first PDN corresponding to each other in the in-memory database.

With reference to the fourth aspect or the foregoing possible implementation, in another possible implementation, the obtaining unit is further configured to obtain a second statistics value of the VoLTE traffic that is obtained through statistics collection by an application processor AP; and the addition unit is further configured to add the second statistics value of the VoLTE traffic that is obtained by the obtaining unit to the first statistics value of the VoLTE traffic.

With reference to the fourth aspect or the foregoing possible implementations, in another possible implementation, the obtaining unit is specifically configured to:

receive the second statistics value of the VoLTE traffic that is sent by the AP; or query traffic data obtained through statistics collection by the AP, to obtain the second statistics value of the VoLTE traffic.

With reference to the fourth aspect or the foregoing possible implementations, in another possible implementation, the obtaining unit is specifically configured to:

send a first PDN registration request to a network side, where the first PDN registration request includes the APN of the first PDN, so that the network side obtains the IP address of the first PDN according to the APN of the first PDN; and receive the IP address of the first PDN that is sent by the network side.

With reference to the fourth aspect or the foregoing possible implementations, in another possible implementation, the apparatus further includes:

a determining unit, configured to determine whether the first statistics value of the VoLTE traffic is greater than or equal to a limiting value of the VoLTE traffic; and a transmission unit, configured to: when the determining unit determines that the first statistics value of the VoLTE traffic is greater than or equal to the limiting value of the VoLTE traffic, transmit a VoLTE service according to a handover policy, where the VoLTE service is a VoLTE voice service or a VoLTE video service.

With reference to the fourth aspect or the foregoing possible implementations, in another possible implementation, the receiving unit is further configured to: before the transmission unit transmits the VoLTE service according to the handover policy, receive the handover policy sent by the AP, where the handover policy is sent by the AP after the AP receives a selection trigger of a user for the handover policy.

With reference to the fourth aspect or the foregoing possible implementations, in another possible implementation, the handover policy is: when the first statistics value of the VoLTE traffic is greater than or equal to the limiting value of the VoLTE traffic, transmission of the VoLTE voice service and transmission of the VoLTE video service are both unrestricted; and the transmission unit is specifically configured to:

when the VoLTE service is the VoLTE voice service, transmit collected voice data by using an LTE network; and when the VoLTE service is the VoLTE video service, transmit collected voice data and image data by using the LTE network.

With reference to the fourth aspect or the foregoing possible implementations, in another possible implementation, the handover policy is: when the first statistics value of the VoLTE traffic is greater than or equal to the limiting value of the VoLTE traffic, transmission of the VoLTE voice service is unrestricted, and transmission of the VoLTE video service is restricted; and the transmission unit is specifically configured to:

when the VoLTE service is the VoLTE voice service, transmit collected voice data by using an LTE network; and when the VoLTE service is the VoLTE video service, switch a video mode to a voice mode, and transmit collected voice data by using the LTE network.

With reference to the fourth aspect or the foregoing possible implementations, in another possible implementation, the handover policy is: when the first statistics value of the VoLTE traffic is greater than or equal to the limiting value of the VoLTE traffic, transmission of the VoLTE voice service and transmission of the VoLTE video service are both restricted; and the transmission unit is specifically configured to:

when the VoLTE service is the VoLTE voice service, perform a handover from an LTE network to a 2nd generation mobile communications technology 2G/3rd generation mobile communications technology 3G network, and transmit collected voice data by using a circuit switched CS domain or a packet switched PS domain; and when the VoLTE service is the VoLTE video service, switch a video mode to a voice mode, and transmit collected voice data by using the CS domain or the PS domain.

With reference to the fourth aspect or the foregoing possible implementations, in another possible implementation, the handover policy is: when the first statistics value of the VoLTE traffic is greater than or equal to the limiting value of the VoLTE traffic, reducing a codec rate of the VoLTE voice service, and reducing a transmission parameter of the VoLTE video service; and the transmission unit is specifically configured to:

when the VoLTE service is the VoLTE voice service, reduce a codec rate of collected voice data; and when the VoLTE service is the VoLTE video service, reduce a transmission parameter of collected video data, where the transmission parameter of the video data includes one or more of the following: resolution of image data in the video data, a frame rate of image data in the video data, or a codec rate of voice data in the video data.

According to a fifth aspect of the present invention, a traffic statistics collection apparatus is provided, including:

an obtaining unit, configured to: when a second Internet Protocol IP packet is detected, obtain a second IP address of the second IP packet, obtain a packet length of the second IP packet, and obtain, from an in-memory database, an access point name APN corresponding to the second IP address of the second IP packet; and an addition unit, configured to: when the APN that corresponds to the second IP address of the second IP packet and that is obtained by the obtaining unit is an APN of a first public data network PDN, add the packet length of the second IP packet to a second statistics value of voice over Long Term Evolution LTE VoLTE traffic, where the first PDN is a PDN required by a bearer that establishes a VoLTE service.

With reference to the fifth aspect, in a possible implementation, the obtaining unit is further configured to obtain a first statistics value of the VoLTE traffic that is obtained through statistics collection by a modem;

the addition unit is further configured to add the first statistics value of the VoLTE traffic to the second statistics value of the VoLTE traffic; and the apparatus further includes:

a display unit, configured to display the second statistics value of the VoLTE traffic that is obtained by the addition unit to a user.

With reference to the fifth aspect or the foregoing possible implementations, in another possible implementation, the obtaining unit is specifically configured to:

receive the first statistics value of the VoLTE traffic that is sent by the modem; or query traffic data obtained through statistics collection by the modem, to obtain the first statistics value of the VoLTE traffic.

With reference to the fifth aspect or the foregoing possible implementations, in another possible implementation, the addition unit is further configured to: when the APN that corresponds to the second IP address of the second IP packet and that is obtained by the obtaining unit is an APN of a second PDN, add the packet length of the second IP packet to a statistics value of data traffic, where the second PDN is a PDN required by a bearer that establishes a data service; and the display unit is further configured to display the statistics value of the data traffic that is obtained by the addition unit to the user.

With reference to the fifth aspect or the foregoing possible implementations, in another possible implementation, the obtaining unit is further configured to obtain an IP address of the second PDN before the obtaining unit detects the second Internet Protocol IP packet; and the apparatus further includes:

a storage unit, configured to store the IP address of the second PDN that is obtained by the obtaining unit and the APN of the second PDN corresponding to each other in the in-memory database.

With reference to the fifth aspect or the foregoing possible implementations, in another possible implementation, the obtaining unit is specifically configured to:

send a second PDN registration request to a network side by using the modem, where the second PDN registration request includes the APN of the second PDN, so that the network side obtains the IP address of the second PDN according to the APN of the second PDN; and receive the IP address of the second PDN that is sent by the network side by using the modem.

According to a sixth aspect of the present invention, a traffic statistics collection apparatus is provided, including:

an obtaining unit, configured to: when a second Internet Protocol IP packet is detected, obtain a packet length of the second IP packet; and an addition unit, configured to add the packet length of the second IP packet that is obtained by the obtaining unit to a statistics value of traffic, where the obtaining unit is further configured to obtain a first statistics value of voice over Long Term Evolution LTE VoLTE traffic that is obtained through statistics collection by a modem; and the addition unit is further configured to add the first statistics value of the VoLTE traffic that is obtained by the obtaining unit to the statistics value of the traffic.

With reference to the sixth aspect, in a possible implementation, the obtaining unit is specifically configured to:

receive the first statistics value of the VoLTE traffic that is sent by the modem; or query traffic data obtained through statistics collection by the modem, to obtain the first statistics value of the VoLTE traffic.

According to a seventh aspect of the present invention, a traffic statistics collection apparatus is provided, including:

a processor, configured to: when a first Internet Protocol IP packet is detected, obtain a first IP address of the first IP packet, obtain a packet length of the first IP packet, obtain, from an in-memory database, an access point name APN corresponding to the first IP address of the first IP packet, and when the APN corresponding to the first IP address of the first IP packet is an APN of a first public data network PDN, add the packet length of the first IP packet to a first statistics value of voice over Long Term Evolution LTE VoLTE traffic, where the first PDN is a PDN required by a bearer that establishes a VoLTE service.

With reference to the seventh aspect, in a possible implementation, the processor is further configured to obtain an IP address of the first PDN before the first Internet Protocol IP packet is detected; and the apparatus further includes:

a memory, configured to store the IP address of the first PDN that is obtained by the processor and the APN of the first PDN corresponding to each other in the in-memory database.

With reference to the seventh aspect or the foregoing possible implementation, in another possible implementation, the processor is further configured to: obtain a second statistics value of the VoLTE traffic that is obtained through statistics collection by an application processor AP, and add the second statistics value of the VoLTE traffic to the first statistics value of the VoLTE traffic.

With reference to the seventh aspect or the foregoing possible implementations, in another possible implementation, the apparatus further includes a receiver, configured to receive the second statistics value of the VoLTE traffic that is sent by the AP; or the processor is specifically configured to query traffic data obtained through statistics collection by the AP, to obtain the second statistics value of the VoLTE traffic.

With reference to the seventh aspect or the foregoing possible implementations, in another possible implementation, the apparatus further includes a transmitter, configured to send a first PDN registration request to a network side, where the first PDN registration request includes the APN of the first PDN, so that the network side obtains the IP address of the first PDN according to the APN of the first PDN; and the receiver is further configured to receive the IP address of the first PDN that is sent by the network side.

With reference to the seventh aspect or the foregoing possible implementations, in another possible implementation, the processor is further configured to: determine whether the first statistics value of the VoLTE traffic is greater than or equal to a limiting value of the VoLTE traffic, and when the first statistics value of the VoLTE traffic is greater than or equal to the limiting value of the VoLTE traffic, transmit a VoLTE service according to a handover policy, where the VoLTE service is a VoLTE voice service or a VoLTE video service.

With reference to the seventh aspect or the foregoing possible implementations, in another possible implementation, the receiver is further configured to: before the processor transmits the VoLTE service according to the handover policy, receive the handover policy sent by the AP, where the handover policy is sent by the AP after the AP receives a selection trigger of a user for the handover policy.

With reference to the seventh aspect or the foregoing possible implementations, in another possible implementation, the handover policy is: when the first statistics value of the VoLTE traffic is greater than or equal to the limiting value of the VoLTE traffic, transmission of the VoLTE voice service and transmission of the VoLTE video service are both unrestricted; and the processor is specifically configured to:

when the VoLTE service is the VoLTE voice service, transmit collected voice data by using an LTE network; and when the VoLTE service is the VoLTE video service, transmit collected voice data and image data by using the LTE network.

With reference to the seventh aspect or the foregoing possible implementations, in another possible implementation, the handover policy is: when the first statistics value of the VoLTE traffic is greater than or equal to the limiting value of the VoLTE traffic, transmission of the VoLTE voice service is unrestricted, and transmission of the VoLTE video service is restricted; and the processor is specifically configured to:

when the VoLTE service is the VoLTE voice service, transmit collected voice data by using an LTE network; and when the VoLTE service is the VoLTE video service, switch a video mode to a voice mode, and transmit collected voice data by using the LTE network.

With reference to the seventh aspect or the foregoing possible implementations, in another possible implementation, the handover policy is: when the first statistics value of the VoLTE traffic is greater than or equal to the limiting value of the VoLTE traffic, transmission of the VoLTE voice service and transmission of the VoLTE video service are both restricted; and the processor is specifically configured to:

when the VoLTE service is the VoLTE voice service, perform a handover from an LTE network to a 2nd generation mobile communications technology 2G/3rd generation mobile communications technology 3G network, and transmit collected voice data by using a circuit switched CS domain or a packet switched PS domain; and when the VoLTE service is the VoLTE video service, switch a video mode to a voice mode, and transmit collected voice data by using the CS domain or the PS domain.

With reference to the seventh aspect or the foregoing possible implementations, in another possible implementation, the handover policy is: when the first statistics value of the VoLTE traffic is greater than or equal to the limiting value of the VoLTE traffic, reducing a codec rate of the VoLTE voice service, and reducing a transmission parameter of the VoLTE video service; and the processor is specifically configured to:

when the VoLTE service is the VoLTE voice service, reduce a codec rate of collected voice data; and when the VoLTE service is the VoLTE video service, reduce a transmission parameter of collected video data, where the transmission parameter of the video data includes one or more of the following: resolution of image data in the video data, a frame rate of image data in the video data, or a codec rate of voice data in the video data.

According to an eighth aspect of the present invention, a traffic statistics collection apparatus is provided, including:

a processor, configured to: when a second Internet Protocol IP packet is detected, obtain a second IP address of the second IP packet, obtain a packet length of the second IP packet, obtain, from an in-memory database, an access point name APN corresponding to the second IP address of the second IP packet, and when the APN corresponding to the second IP address of the second IP packet is an APN of a first public data network PDN, add the packet length of the second IP packet to a second statistics value of voice over Long Term Evolution LTE VoLTE traffic, where the first PDN is a PDN required by a bearer that establishes a VoLTE service.

With reference to the eighth aspect, in a possible implementation, the processor is further configured to: obtain a first statistics value of the VoLTE traffic that is obtained through statistics collection by a modem, add the first statistics value of the VoLTE traffic to the second statistics value of the VoLTE traffic, and display the second statistics value of the VoLTE traffic to a user.

With reference to the eighth aspect or the foregoing possible implementation, in another possible implementation, the apparatus further includes a receiver, further configured to receive the first statistics value of the VoLTE traffic that is sent by the modem; or the processor is specifically configured to query traffic data obtained through statistics collection by the modem, to obtain the first statistics value of the VoLTE traffic.

With reference to the eighth aspect or the foregoing possible implementations, in another possible implementation, the processor is further configured to: when the APN corresponding to the second IP address of the second IP packet is an APN of a second PDN, add the packet length of the second IP packet to a statistics value of data traffic, and display the statistics value of the data traffic to the user, where the second PDN is a PDN required by a bearer that establishes a data service.

With reference to the eighth aspect or the foregoing possible implementations, in another possible implementation, the processor is further configured to obtain an IP address of the second PDN before the second Internet Protocol IP packet is detected; and the apparatus further includes:

a memory, configured to store the IP address of the second PDN that is obtained by the processor and the APN of the second PDN corresponding to each other in the in-memory database.

With reference to the eighth aspect or the foregoing possible implementations, in another possible implementation, the transmitter is further configured to send a second PDN registration request to a network side by using the modem, where the second PDN registration request includes the APN of the second PDN, so that the network side obtains the IP address of the second PDN according to the APN of the second PDN; and the receiver is further configured to receive the IP address of the second PDN that is sent by the network side by using the modem.

According to a ninth aspect of the present invention, a traffic statistics collection apparatus is provided, including:

a processor, configured to: when a second Internet Protocol IP packet is detected, obtain a packet length of the second IP packet, add the packet length of the second IP packet to a statistics value of traffic, obtain a first statistics value of voice over Long Term Evolution LTE VoLTE traffic that is obtained through statistics collection by a modem, and add the first statistics value of the VoLTE traffic to the statistics value of the traffic.

With reference to the ninth aspect, in a possible implementation, the apparatus further includes a receiver, configured to receive the first statistics value of the VoLTE traffic that is sent by the modem; or the processor is specifically configured to query traffic data obtained through statistics collection by the modem, to obtain the first statistics value of the VoLTE traffic.

According to a tenth aspect, a terminal device is provided, including:

a modem, configured to: when a first Internet Protocol IP packet is detected, obtain a first IP address of the first IP packet, obtain a packet length of the first IP packet, obtain, from an in-memory database, an access point name APN corresponding to the first IP address of the first IP packet, and when the APN corresponding to the first IP address of the first IP packet is an APN of a first public data network PDN, add the packet length of the first IP packet to a first statistics value of voice over Long Term Evolution LTE VoLTE traffic, where the first PDN is a PDN required by a bearer that establishes a VoLTE service; and an application processor AP, configured to: when a second IP packet is detected, obtain a second IP address of the second IP packet, obtain a packet length of the second IP packet, obtain, from the in-memory database, an APN corresponding to the second IP address of the second IP packet, and when the APN corresponding to the second IP address of the second IP packet is an APN of the first PDN, add the packet length of the second IP packet to a second statistics value of the VoLTE traffic.

According to the traffic statistics collection method and apparatus, and the terminal device that are provided in embodiments of the present invention, when a modem detects a first IP packet, an APN corresponding to an obtained first IP address of the first IP packet is obtained from an in-memory database according to the first IP address of the first IP packet, and when the APN corresponding to the first IP address of the first IP packet is an APN of a PDN required by a bearer that establishes a VoLTE service, an obtained packet length of the first IP packet is added to a first statistics value of VoLTE traffic, so as to collect statistics about the VoLTE traffic. In this way, compared with the prior art in which statistics about traffic on only an AP side can be collected, statistics about traffic generated when a user makes an audio-video call by using an LTE network is collected.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It is well-known that, when statistics about traffic generated when a user accesses the Internet is collected, because a protocol stack used for a data service is deployed on an AP side of user equipment, the statistics about the traffic generated when the user accesses the Internet may be collected based on an AP. With continuous development of communications technologies, an LTE network is becoming increasingly popular. The LTE network can provide users with high-speed data services and can also provide users with high-quality audio-video services by using a VoLTE technology. However, because an (IP Multimedia Subsystem, IMS) protocol stack used for an audio-video service is usually deployed on a modem (modem) side of user equipment, statistics about traffic generated when a user uses the audio-video service cannot be collected based on an AP. A traffic statistics collection method provided by the present invention can collect statistics about traffic generated in a process in which a user uses an audio-video service. A specific implementation process is described in detail by using the following embodiments.

It should be noted that, the user equipment described in the embodiments of the present invention may be a handheld device such as a mobile phone or a tablet computer (portable Android device, PAD).

Figure 1:
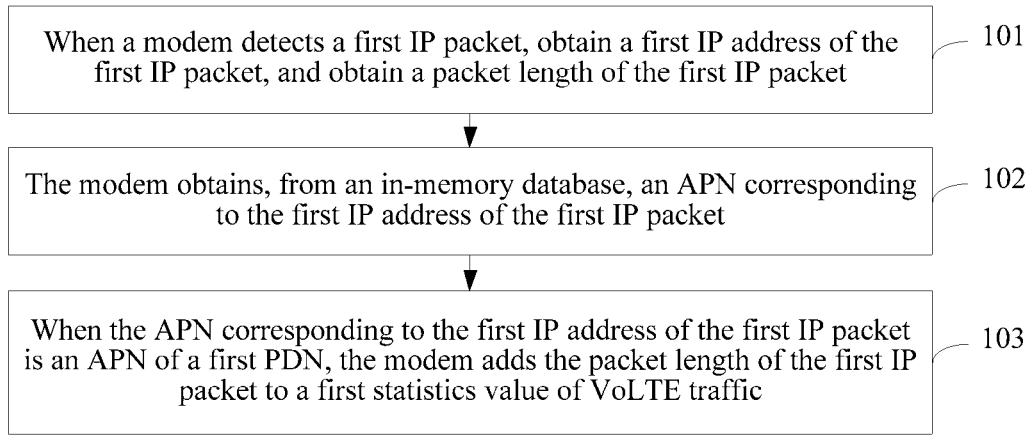
FIG. 1 is a flowchart of a traffic statistics collection method according to an embodiment of the present invention.

An embodiment of the present invention provides a traffic statistics collection method. As shown in FIG. 1, the method may include the following steps.

101. When a modem detects a first Internet Protocol (Internet Protocol, IP) packet, obtain a first IP address of the first IP packet, and obtain a packet length of the first IP packet.

When the first IP packet is a packet received by the modem, the first IP address is a source IP address of the first IP packet. When the first IP packet is a packet that needs to be sent to a network side by the modem, the first IP address is a destination IP address of the first IP packet.

102. The modem obtains, from an in-memory database, an access point name (Access point name, APN) corresponding to the first IP address of the first IP packet.

The in-memory database stores at least one IP address and an APN that corresponds to each IP address. After obtaining the first IP address of the first IP packet, the modem may match the first IP address of the first IP packet with an IP address stored in the in-memory database, so as to obtain, from the in-memory database, the APN corresponding to the first IP address of the first IP packet.

103. When the APN corresponding to the first IP address of the first IP packet is an APN of a first public data network (Public Data Network, PDN), the modem adds the packet length of the first IP packet to a first statistics value of VoLTE traffic.

The first PDN is a PDN required by a bearer that establishes a VoLTE service.

Specifically, after obtaining, from the in-memory database, the APN corresponding to the first IP address of the first IP packet, the modem may determine whether the APN corresponding to the first IP address of the first IP packet is an APN of the PDN required by a bearer that establishes a VoLTE service, that is, the APN of the first PDN. After determining that the APN corresponding to the first IP address of the first IP packet is the APN of the first PDN, the modem adds the obtained packet length of the first IP packet to the first statistics value of the VoLTE traffic, so as to collect statistics about the VoLTE traffic.

Further, to enable the modem to determine whether a packet length of a detected IP packet needs to be added to the VoLTE traffic, before the detecting, by a modem, a first IP packet in step 101, the traffic statistics collection method provided in this embodiment of the present invention may further include: obtaining, by the modem, an IP address of the first PDN, and storing the IP address of the first PDN and the APN of the first PDN corresponding to each other in the in-memory database.

Further, considering that some VoLTE services using an IMS protocol stack may be deployed on an AP side, to collect statistics about all VoLTE traffic, the traffic statistics collection method provided in this embodiment of the present invention may further include: obtaining, by the modem, a second statistics value of the VoLTE traffic that is obtained through statistics collection by an AP, and adding the second statistics value of the VoLTE traffic to the first statistics value of the VoLTE traffic.

Further, in a possible implementation, the obtaining, by the modem, a second statistics value of the VoLTE traffic that is obtained through statistics collection by an AP maybe specifically: receiving, by the modem, the second statistics value of the VoLTE traffic that is sent by the AP.

Alternatively, in another possible implementation, the obtaining, by the modem, a second statistics value of the VoLTE traffic that is obtained through statistics collection by an AP is specifically: querying, by the modem, traffic data obtained through statistics collection by the AP, to obtain the second statistics value of the VoLTE traffic.

Further, the obtaining, by the modem, an IP address of the first PDN may be specifically: sending, by the modem, a first PDN registration request to a network side, where the first PDN registration request includes the APN of the first PDN, so that the network side can obtain the IP address of the first PDN according to the APN of the first PDN; and receiving, by the modem, the IP address of the first PDN that is sent by the network side.

Further, when the VoLTE traffic is restricted, to save user traffic without affecting use of an audio-video service by a user, the traffic statistics collection method provided in this embodiment of the present invention further includes: determining, by the modem, whether the first statistics value of the VoLTE traffic is greater than or equal to a limiting value of the VoLTE traffic; and when the first statistics value of the VoLTE traffic is greater than or equal to the limiting value of the VoLTE traffic, transmitting, by the modem, a VoLTE service according to a handover policy, where the VoLTE service is a VoLTE voice service or a VoLTE video service.

It should be noted that, in this embodiment of the present invention, when all VoLTE services using an IMS protocol stack are deployed on a modem side, the first statistics value used by the modem to determine whether the VoLTE traffic is greater than or equal to the limiting value of the VoLTE traffic is the first statistics value that is obtained through statistics collection by the modem in step 103. When VoLTE services using an IMS protocol stack are deployed on the modem side and the AP side, the first statistics value used by the modem to determine whether the VoLTE traffic is greater than or equal to the limiting value of the VoLTE traffic is a first statistics value. The first statistics value is obtained after the second statistics value of the VoLTE traffic that is obtained through statistics collection by the AP is added to the first statistics value of the VoLTE traffic.

Further, before the determining, by the modem, whether the first statistics value of the VoLTE traffic is greater than or equal to a limiting value of the VoLTE traffic, the traffic statistics collection method provided in this embodiment of the present invention further includes: receiving, by the modem, the limiting value of the VoLTE traffic that is sent by the AP.

Further, to enable adjustment of a transmission solution of the VoLTE service according to a selection by a user when the VoLTE traffic is restricted, before the transmitting, by the modem, a VoLTE service according to a handover policy, the traffic statistics collection method provided in this embodiment of the present invention further includes: receiving, by the modem, the handover policy sent by the AP, where the handover policy is sent by the AP after the AP receives a selection trigger of the user for the handover policy.

Further, the handover policy is: when the first statistics value of the VoLTE traffic is greater than or equal to the limiting value of the VoLTE traffic, transmission of the VoLTE voice service and transmission of the VoLTE video service are both unrestricted. The transmitting, by the modem, a VoLTE service according to a handover policy may be specifically:

when the VoLTE service is the VoLTE voice service, transmitting, by the modem, collected voice data by using an LTE network; and when the VoLTE service is the VoLTE video service, transmitting, by the modem, collected voice data and image data by using the LTE network.

Further, the handover policy is: when the first statistics value of the VoLTE traffic is greater than or equal to the limiting value of the VoLTE traffic, transmission of the VoLTE voice service is unrestricted, and transmission of the VoLTE video service is restricted. The transmitting, by the modem, a VoLTE service according to a handover policy may be specifically:

when the VoLTE service is the VoLTE voice service, transmitting, by the modem, collected voice data by using an LTE network; and when the VoLTE service is the VoLTE video service, switching, by the modem, a video mode to a voice mode, and transmitting collected voice data by using the LTE network.

Further, the handover policy is: when the first statistics value of the VoLTE traffic is greater than or equal to the limiting value of the VoLTE traffic, transmission of the VoLTE voice service and transmission of the VoLTE video service are both restricted. The transmitting, by the modem, a VoLTE service according to a handover policy may be specifically:

when the VoLTE service is the VoLTE voice service, performing, by the modem, a handover from an LTE network to a 2nd Generation mobile communications technology/3rd Generation mobile communications technology (2nd Generation/3rd Generation, 2G/3G) network, and transmitting collected voice data by using a circuit switched (Circuit Switching, CS) domain or a packet switched (Packet Switch, PS) domain.

The performing, by the modem, a handover from an LTE network to a 2G/3G network, and transmitting collected voice data by using a CS domain refers to a circuit switched fallback (Circuit Switched FallBack, CSFB) technology.

When the VoLTE service is the VoLTE video service, the modem switches a video mode to a voice mode, and transmits collected voice data by using the CS domain or the PS domain.

Further, the handover policy is: when the first statistics value of the VoLTE traffic is greater than or equal to the limiting value of the VoLTE traffic, reducing a codec rate of the VoLTE voice service, and reducing a transmission parameter of the VoLTE video service. The transmitting, by the modem, a VoLTE service according to a handover policy may be specifically:

when the VoLTE service is the VoLTE voice service, reducing, by the modem, a codec rate of collected voice data; and when the VoLTE service is the VoLTE video service, reducing, by the modem, a transmission parameter of collected video data, where the transmission parameter of the video data includes one or more of the following: resolution of image data in the video data, a frame rate of image data in the video data, or a codec rate of voice data in the video data.

Further, to enable displaying of VoLTE traffic obtained through statistics collection to the user for the user to query, after step 103, the traffic statistics collection method provided in this embodiment of the present invention further includes: sending, by the modem, the first statistics value of the VoLTE traffic to the AP.

According to the traffic statistics collection method provided in this embodiment of the present invention, when a modem detects a first IP packet, an APN corresponding to an obtained first IP address of the first IP packet is obtained from an in-memory database according to the first IP address of the first IP packet, and when the APN corresponding to the first IP address of the first IP packet is an APN of a PDN required by a bearer that establishes a VoLTE service, an obtained packet length of the first IP packet is added to a first statistics value of VoLTE traffic, so as to collect statistics about the VoLTE traffic. In this way, compared with the prior art in which statistics about traffic on only an AP side can be collected, statistics about traffic generated when a user makes an audio-video call by using an LTE network is collected.

Figure 2:
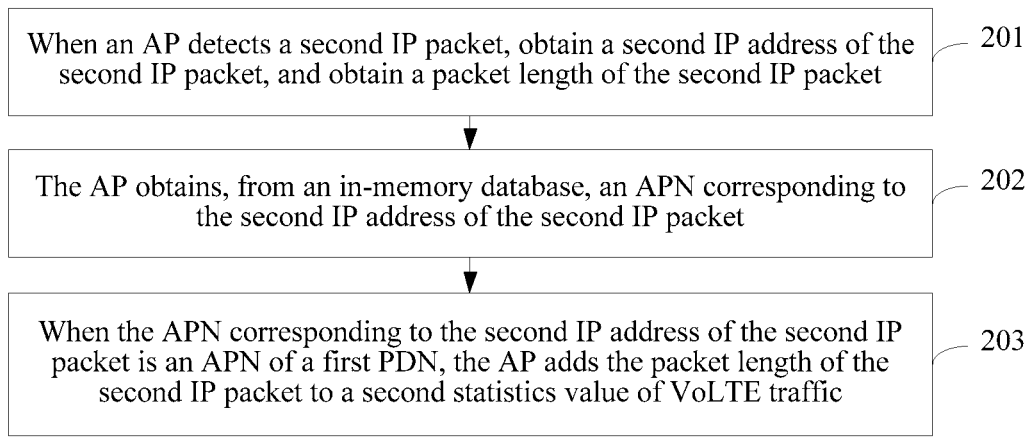
FIG. 2 is a flowchart of a traffic statistics collection method according to another embodiment of the present invention.

Another embodiment of the present invention provides a traffic statistics collection method. As shown in FIG. 2, the method may include the following steps.

201. When an AP detects a second IP packet, obtain a second IP address of the second IP packet, and obtain a packet length of the second IP packet.

When the second IP packet is a packet received by the AP, the second IP address is a source IP address of the second IP packet. When the second IP packet is a packet that needs to be sent to a network side by the AP, the second IP address is a destination IP address of the second IP packet.

202. The AP obtains, from an in-memory database, an APN corresponding to the second IP address of the second IP packet.

The in-memory database stores at least one IP address and an APN that corresponds to each IP address. After obtaining the second IP address of the second IP packet, the AP may match the second IP address of the second IP packet with an IP address stored in the in-memory database, so as to obtain, from the in-memory database, the APN corresponding to the second IP address of the second IP packet.

203. When the APN corresponding to the second IP address of the second IP packet is an APN of a first PDN, the AP adds the packet length of the second IP packet to a second statistics value of VoLTE traffic.

The first PDN is a PDN required by a bearer that establishes a VoLTE service.

Specifically, an operator may probably set different charging rules for a data service and a VoLTE service that are provided to a user in an LTE network. In this case, statistics about traffic generated when the user uses the data service and statistics about traffic generated when the user uses the VoLTE service need to be collected separately. Therefore, after obtaining, from the in-memory database, the APN corresponding to the second IP address of the second IP packet, the AP may determine whether the APN corresponding to the second IP address of the second IP packet is an APN of a PDN required by a bearer that establishes a VoLTE service, that is, the APN of the first PDN. After determining that the APN corresponding to the second IP address of the second IP packet is the APN of the first PDN, the AP adds the obtained packet length of the second IP packet to the second statistics value of the VoLTE traffic.

Further, to enable a modem to collect statistics about all VoLTE traffic, after step 203, the traffic statistics collection method provided in this embodiment of the present invention may further include: sending, by the AP, the second statistics value of the VoLTE traffic to the modem.

Further, the traffic statistics collection method provided in this embodiment of the present invention may further include: obtaining, by the AP, a first statistics value of the VoLTE traffic that is obtained through statistics collection by the modem; adding, by the AP, the first statistics value of the VoLTE traffic to the second statistics value of the VoLTE traffic; and displaying, by the AP, the second statistics value of the VoLTE traffic to the user.

It should be noted that, in this embodiment of the present invention, when VoLTE services using an IMS protocol stack are deployed on a modem side and on an AP side, the second statistics value of the VoLTE traffic that is displayed to the user by the AP is a second statistics value that is obtained after the AP adds the first statistics value of the VoLTE traffic that is obtained through statistics collection by the modem to the second statistics value of the VoLTE traffic. Certainly, when all VoLTE services using an IMS protocol stack are deployed on the modem side, after obtaining the first statistics value of the VoLTE traffic that is obtained through statistics collection by the modem, the AP may directly display the first statistics value of the VoLTE traffic that is obtained through statistics collection by the modem to the user.

Further, in a possible implementation, the obtaining, by the AP, a first statistics value of the VoLTE traffic that is obtained through statistics collection by the modem may be specifically: receiving, by the AP, the first statistics value of the VoLTE traffic that is sent by the modem.

Alternatively, in another possible implementation, the obtaining, by the AP, a first statistics value of the VoLTE traffic that is obtained through statistics collection by the modem may be specifically: querying, by the AP, traffic data obtained through statistics collection by the modem, to obtain the first statistics value of the VoLTE traffic.

Further, the traffic statistics collection method provided in this embodiment of the present invention may further include: when the APN corresponding to the second IP address of the second IP packet is an APN of a second PDN, adding, by the AP, the packet length of the second IP packet to a statistics value of data traffic, so as to separately collect statistics about the data traffic and the VoLTE traffic; and displaying, by the AP, the statistics value of the data traffic to the user, where the second PDN is a PDN required by a bearer that establishes a data service.

Further, to enable the AP to determine whether a packet length of a detected IP packet is to be added to the data traffic or is to be added to the VoLTE traffic, before the detecting, by an AP, a second IP packet in step 201, the traffic statistics collection method provided in this embodiment of the present invention may further include: obtaining, by the AP, an IP address of the second PDN, and storing the IP address of the second PDN and the APN of the second PDN corresponding to each other in the in-memory database.

Further, the obtaining, by the AP, an IP address of the second PDN maybe specifically: sending, by the AP, a second PDN registration request to a network side by using the modem, where the second PDN registration request includes the APN of the second PDN, so that the network side obtains the IP address of the second PDN according to the APN of the second PDN; and receiving, by the AP, the IP address of the second PDN that is sent by the network side by using the modem.

According to the traffic statistics collection method provided in this embodiment of the present invention, when an AP detects a second IP packet, an APN corresponding to an obtained second IP address of the second IP packet is obtained from an in-memory database according to the second IP address of the second IP packet, and when the APN corresponding to the second IP address of the second IP packet is an APN of a PDN required by a bearer that establishes a VoLTE service, an obtained packet length of the second IP packet is added to a second statistics value of VoLTE traffic, so as to separately collect statistics about data traffic and the VoLTE traffic.

Figure 3:
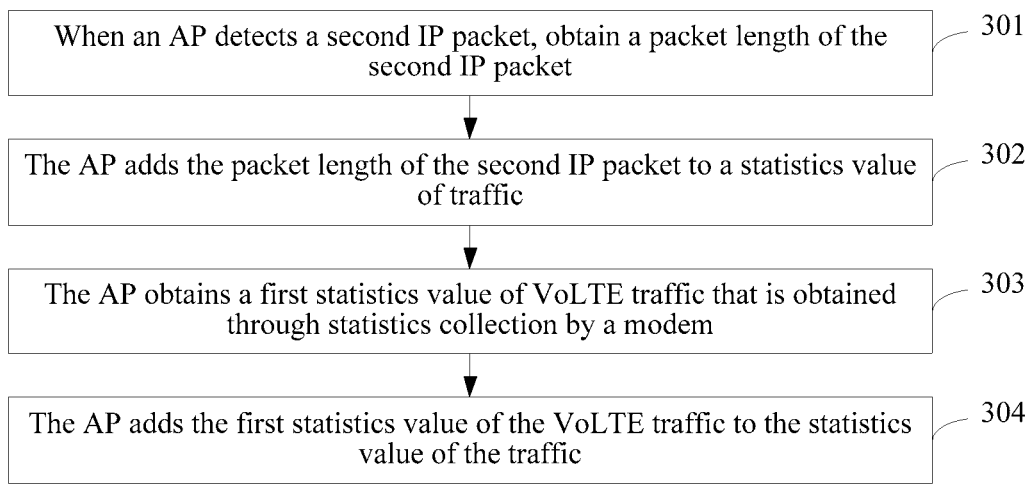
FIG. 3 is a flowchart of a traffic statistics collection method according to another embodiment of the present invention.

Another embodiment of the present invention provides a traffic statistics collection method. As shown in FIG. 3, the method may include the following steps.

301. When an AP detects a second IP packet, obtain a packet length of the second IP packet.

302. The AP adds the packet length of the second IP packet to a statistics value of traffic.

After obtaining the packet length of the second IP packet, the AP may directly add the packet length of the second IP packet to the statistics value of the traffic.

303. The AP obtains a first statistics value of VoLTE traffic that is obtained through statistics collection by a modem.

To ensure that statistics about all traffic generated in a process in which a user uses user equipment can be collected, the AP further needs to obtain the first statistics value of the VoLTE traffic that is obtained through statistics collection by the modem.

Further, in a possible implementation, step 303 may be specifically: receiving, by the AP, the first statistics value of the VoLTE traffic that is sent by the modem. Alternatively, in another possible implementation, step 303 may be specifically: querying, by the AP, traffic data obtained through statistics collection by the modem, to obtain the first statistics value of the VoLTE traffic.

304. The AP adds the first statistics value of the VoLTE traffic to the statistics value of the traffic.

After obtaining the first statistics value of the VoLTE traffic that is obtained through statistics collection by the modem, the AP may add the obtained first statistics value of the VoLTE traffic to the statistics value of the traffic, so as to collect statistics about all the traffic generated when the user uses the user equipment. Further, the AP may further display the statistics value of the traffic that is obtained through statistics collection to the user, making it convenient for the user to query the statistics value of the traffic.

It should be noted that, in this embodiment of the present invention, the statistics value of the traffic that is displayed to the user by the AP is a statistics value of the traffic that is obtained after the AP adds the first statistics value of the VoLTE traffic that is obtained through statistics collection by the modem to the statistics value of the traffic.

According to the traffic statistics collection method provided in this embodiment of the present invention, when an AP detects a second IP packet, an obtained packet length of the second IP packet is added to a statistics value of traffic, a first statistics value of VoLTE traffic that is obtained through statistics collection by a modem is obtained, and the first statistics value of the VoLTE traffic is added to the statistics value of the traffic. Compared with the prior art in which statistics about traffic on only an AP side can be collected, completeness of traffic statistics collection is ensured.

Figure 4:
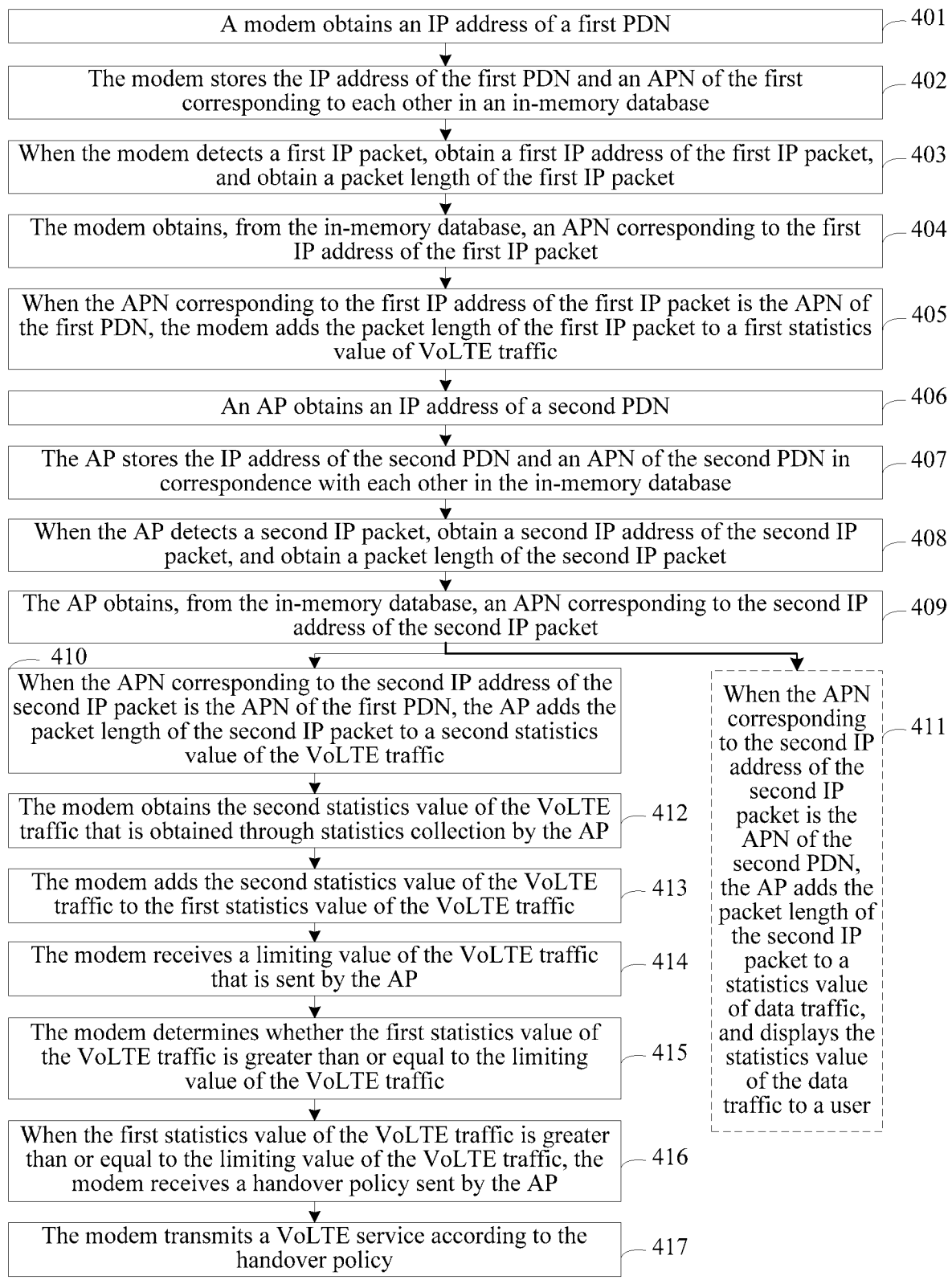
FIG. 4 is a flowchart of a traffic statistics collection method according to another embodiment of the present invention.

Another embodiment of the present invention provides a traffic statistics collection method. As shown in FIG. 4, the method may include the following steps.

401. A modem obtains an IP address of a first PDN.

When user equipment is powered on, or an airplane mode of the user equipment is turned off, or the user equipment is handed over from cell coverage of a 2G/3G network to cell coverage of an IMS LTE network, or the user equipment is handed over from cell coverage of an LTE network that does not support a VoLTE service to cell coverage of an LTE network that supports a VoLTE service, or the user equipment receives an instruction that is sent by a network side and that is used for activating a PDN required for establishing a VoLTE service and reinitiates PDN activation according to the instruction and the activation succeeds, the modem obtains a PDN required by a bearer that establishes a VoLTE service, that is, the IP address of the first PDN.

The obtaining, by a modem, an IP address of a first PDN may specifically include: sending, by the modem, a first PDN registration request including an APN of the first PDN to a network side. When the network side receives the first PDN registration request, the network side may obtain the IP address of the first PDN according to the APN of the first PDN, and then send the obtained IP address of the first PDN to the modem. In this case, the modem may receive the IP address of the first PDN that is sent by the network side.

402. The modem stores the IP address of the first PDN and an APN of the first PDN corresponding to each other in an in-memory database.

After obtaining the IP address of the first PDN, the modem may store the obtained IP address of the first PDN and the APN of the first PDN corresponding to each other in the in-memory database for subsequent use. The in-memory database is used for storing at least one IP address and an APN that corresponds to each IP address, and data stored in the in-memory database is erased when the user equipment is powered off.

403. When the modem detects a first IP packet, obtain a first IP address of the first IP packet, and obtain a packet length of the first IP packet.

When the first IP packet is a packet received by the modem, the first IP address is a source IP address of the first IP packet. When the first IP packet is a packet that needs to be sent to a network side by the modem, the first IP address is a destination IP address of the first IP packet.

For example, when the modem receives the first IP packet, the modem may parse the first IP packet, to obtain a source IP address of the first IP packet, and use the obtained source IP address of the first IP packet as the first IP address, and may further obtain the packet length of the first IP packet. When the modem needs to send the first IP packet, the modem may obtain a destination IP address of the first IP packet by parsing the first IP packet, and use the obtained destination IP address of the first IP packet as the first IP address, and may further obtain the packet length of the first IP packet.

404. The modem obtains, from the in-memory database, an APN corresponding to the first IP address of the first IP packet.

After obtaining the first IP address of the first IP packet, the modem may match the first IP address of the first IP packet with an IP address stored in the in-memory database, so as to obtain, from the in-memory database, the APN corresponding to the first IP address of the first IP packet.

After the modem obtains, from the in-memory database, the APN corresponding to the first IP address of the first IP packet, to determine whether traffic generated when the first IP packet is transmitted is VoLTE traffic, the modem may determine whether the obtained APN corresponding to the first IP address of the first IP packet is an APN of a PDN required by a bearer that establishes a VoLTE service, that is, the APN of the first PDN.

405. When the APN corresponding to the first IP address of the first IP packet is the APN of the first PDN, the modem adds the packet length of the first IP packet to a first statistics value of VoLTE traffic.

When the modem determines that the APN corresponding to the first IP address of the first IP packet is the APN of the first PDN, it indicates that traffic generated when the first IP packet is transmitted is the VoLTE traffic. In this case, the modem may add the packet length of the first IP packet to the first statistics value of the VoLTE traffic, so as to collect statistics about the VoLTE traffic.

When the modem determines that the obtained APN corresponding to the first IP address of the first IP packet is not an APN of a PDN required by a bearer that establishes a VoLTE service, that is, when the APN corresponding to the first IP address of the first IP packet is not the APN of the first PDN, the modem does not perform any processing.

406. An AP obtains an IP address of a second PDN.

The second PDN is a PDN required by a bearer that establishes a data service. When the user equipment is powered on, or an airplane mode of the user equipment is turned off, or a data service of the user equipment is turned on, the AP obtains the PDN required by a bearer that establishes a data service, that is, the IP address of the second PDN. The obtaining, by an AP, an IP address of a second PDN may specifically include: sending, by the AP, a second PDN registration request that includes an APN of the second PDN to the network side by using the modem. When the network side receives the second PDN registration request, the network side may obtain the IP address of the second PDN according to the APN of the second PDN, and then send the obtained IP address of the second PDN to the modem. After receiving the IP address of the second PDN, the modem may send the IP address of the second PDN to the AP, so that the AP receives the IP address of the second PDN.

It should be noted that, the data service described in this embodiment of the present invention includes, but is not limited to: Internet access, a multimedia messaging service, mobile phone version upgrade and update, and searching and positioning by a global positioning system (Global Positioning System, GPS).

407. The AP stores the IP address of the second PDN and an APN of the second PDN corresponding to each other in the in-memory database.

After obtaining the IP address of the second PDN, the AP may store the obtained IP address of the second PDN and the APN of the second PDN corresponding to each other in the in-memory database for subsequent use.

408. When the AP detects a second IP packet, obtain a second IP address of the second IP packet, and obtain a packet length of the second IP packet.

When the second IP packet is a packet received by the AP, the second IP address is a source IP address of the second IP packet. When the second IP packet is a packet that needs to be sent to a network side by the AP, the second IP address is a destination IP address of the second IP packet.

For example, when the AP receives the second IP packet, the AP may obtain a source IP address of the second IP packet by parsing the second IP packet, and use the obtained source IP address of the second IP packet as the second IP address, and may further obtain the packet length of the second IP packet. When the AP needs to send the second IP packet to the network side, the AP may obtain a destination IP address of the second IP packet by parsing the second IP packet, and use the obtained destination IP address of the second IP packet as the second IP address, and may further obtain the packet length of the second IP packet.

409. The AP obtains, from the in-memory database, an APN corresponding to the second IP address of the second IP packet.

After obtaining the second IP address of the second IP packet, the AP may match the second IP address of the second IP packet with an IP address stored in the in-memory database, so as to obtain, from the in-memory database, the APN corresponding to the second IP address of the second IP packet.

After the AP obtains, from the in-memory database, the APN corresponding to the second IP address of the second IP packet, to determine whether traffic generated when the second IP packet is transmitted is VoLTE traffic or data traffic, the AP may determine whether the obtained APN corresponding to the second IP address of the second IP packet is an APN of a PDN required by a bearer that establishes a VoLTE service, that is, the APN of the first PDN, or an APN of a PDN required by a bearer that establishes a data service, that is, the APN of the second PDN.

410. When the APN corresponding to the second IP address of the second IP packet is the APN of the first PDN, the AP adds the packet length of the second IP packet to a second statistics value of the VoLTE traffic.

When the AP determines that the APN corresponding to the second IP address of the second IP packet is the APN of the first PDN, it indicates that traffic generated when the second IP packet is transmitted is the VoLTE traffic. In this case, the AP may add the packet length of the second IP packet to the second statistics value of the VoLTE traffic, so as to collect statistics about the VoLTE traffic based on the AP.

411. When the APN corresponding to the second IP address of the second IP packet is the APN of the second PDN, the AP adds the packet length of the second IP packet to a statistics value of data traffic, and displays the statistics value of the data traffic to a user.

When the AP determines that the APN corresponding to the second IP address of the second IP packet is the APN of the second PDN, it indicates that traffic generated when the second IP packet is transmitted is the data traffic. In this case, the AP may add the packet length of the second IP packet to the statistics value of the data traffic, and may display the statistics value of the data traffic that is obtained through statistics collection to the user, for the user to query.

Further, after step 411 is performed, the AP may further determine whether the statistics value of the data traffic that is obtained through statistics collection is greater than or equal to a limiting value that is of the data traffic and that is set by the user, and when the statistics value of the data traffic is greater than or equal to the limiting value that is of the data traffic and that is set by the user, restrict data that needs to be transmitted.

It should be noted that step 401 to step 405 and step 406 to step 411 in this embodiment of the present invention are not performed in a sequential order.

In this embodiment of the present invention, further, when the VoLTE traffic is restricted, to save user traffic without affecting use of an audio-video service by the user, when all VoLTE services using an IMS protocol stack are deployed on a modem side, after step 405 is performed, step 414 to step 417 may be directly performed. However, considering that some VoLTE services using an IMS protocol stack may be deployed on an AP side, before step 414 is performed, step 406 to step 413 further need to be performed.

412. The modem obtains the second statistics value of the VoLTE traffic that is obtained through statistics collection by the AP.

There may be two manners in which the modem obtains the second statistics value of the VoLTE traffic that is obtained through statistics collection by the AP.

Manner 1: The modem receives the second statistics value of the VoLTE traffic that is sent by the AP.

The AP may periodically report a second statistics value of the VoLTE traffic that is obtained through statistics collection by the AP, so that the modem may receive the second statistics value of the VoLTE traffic that is sent by the AP.

Manner 2: The modem queries traffic data obtained through statistics collection by the AP, to obtain the second statistics value of the VoLTE traffic.

The modem may proactively query the traffic data obtained through statistics collection by the AP, to obtain the second statistics value of the VoLTE traffic that is obtained through statistics collection by the AP.

413. The modem adds the second statistics value of the VoLTE traffic to the first statistics value of the VoLTE traffic.

After obtaining the second statistics value of the VoLTE traffic that is obtained through statistics collection by the AP, the modem may add the second statistics value of the VoLTE traffic to the first statistics value of the VoLTE traffic, to obtain all generated VoLTE traffic.

414. The modem receives a limiting value of the VoLTE traffic that is sent by the AP.

The user may set limiting values for the data traffic and the VoLTE traffic respectively. After the limiting values are set for the data traffic and the VoLTE traffic respectively, the AP may send the limiting value that is of the VoLTE traffic and that is set by the user to the modem.

415. The modem determines whether the first statistics value of the VoLTE traffic is greater than or equal to the limiting value of the VoLTE traffic.

It should be noted that, in this embodiment of the present invention, when all VoLTE services using an IMS protocol stack are deployed on a modem side, the first statistics value used by the modem to determine whether the VoLTE traffic is greater than or equal to the limiting value of the VoLTE traffic is the first statistics value that is obtained through statistics collection by the modem in step 405. When VoLTE services using an IMS protocol stack are deployed on the modem side and the AP side, the first statistics value used by the modem to determine whether the VoLTE traffic is greater than or equal to the limiting value of the VoLTE traffic is a first statistics value that is obtained after the modem adds the second statistics value of the VoLTE traffic that is obtained through statistics collection by the AP to the first statistics value of the VoLTE traffic in step 413.

416. When the first statistics value of the VoLTE traffic is greater than or equal to the limiting value of the VoLTE traffic, the modem receives a handover policy sent by the AP.

The handover policy is sent by the AP after the AP receives a selection trigger of the user for the handover policy. Specifically, after receiving the limiting value of the VoLTE traffic that is sent by the AP, the modem may determine whether the first statistics value of the VoLTE traffic that is obtained through statistics collection is greater than or equal to the limiting value of the VoLTE traffic, and after determining that the first statistics value of the VoLTE traffic is greater than or equal to the limiting value of the VoLTE traffic, receive the handover policy that is selected by the user and that is sent by the AP.

417. The modem transmits a VoLTE service according to the handover policy.

The VoLTE service is a VoLTE voice service or a VoLTE video service. When the first statistics value of the VoLTE traffic is greater than or equal to the limiting value of the VoLTE traffic, after the modem receives the handover policy sent by the AP, when there is a VoLTE service that needs to be transmitted, the modem needs to transmit the VoLTE service according to the handover policy selected by the user.

In a possible implementation, the handover policy is: when the first statistics value of the VoLTE traffic is greater than or equal to the limiting value of the VoLTE traffic, transmission of the VoLTE voice service and transmission of the VoLTE video service are both unrestricted. In this case, the transmitting, by the modem, a VoLTE service according to a handover policy may be specifically: when the VoLTE service is the VoLTE voice service, transmitting, by the modem, collected voice data by using an LTE network; and when the VoLTE service is the VoLTE video service, transmitting, by the modem, collected voice data and image data by using the LTE network.

In another possible implementation, the handover policy is: when the first statistics value of the VoLTE traffic is greater than or equal to the limiting value of the VoLTE traffic, transmission of the VoLTE voice service is unrestricted, and transmission of the VoLTE video service is restricted. In this case, the transmitting, by the modem, a VoLTE service according to a handover policy may be specifically: when the VoLTE service is the VoLTE voice service, transmitting, by the modem, collected voice data by using an LTE network; and when the VoLTE service is the VoLTE video service, switching, by the modem, a video mode to a voice mode, and transmitting collected voice data by using the LTE network.

In another possible implementation, the handover policy is: when the first statistics value of the VoLTE traffic is greater than or equal to the limiting value of the VoLTE traffic, transmission of the VoLTE voice service and transmission of the VoLTE video service are both restricted. In this case, the transmitting, by the modem, a VoLTE service according to a handover policy may be specifically: when the VoLTE service is the VoLTE voice service, performing a handover from an LTE network to a 2G/3G network, and transmitting collected voice data by using a CS domain or a PS domain; and when the VoLTE service is the VoLTE video service, switching, by the modem, a video mode to a voice mode, and transmitting collected voice data by using the CS domain or the PS domain. Certainly, when the first statistics value of the VoLTE traffic is less than the limiting value of the VoLTE traffic, for example, statistics about the VoLTE traffic is recollected, a VoLTE function of the user equipment needs to be enabled again.

In another possible implementation, the handover policy is: when the first statistics value of the VoLTE traffic is greater than or equal to the limiting value of the VoLTE traffic, a codec rate of the VoLTE voice service is reduced, and a transmission parameter of the VoLTE video service is reduced. In this case, the transmitting, by the modem, a VoLTE service according to a handover policy may be specifically: when the VoLTE service is the VoLTE voice service, reducing, by the modem, a codec rate of collected voice data.

When the voice data is encoded by means of adaptive multirate narrowband encoding (Adaptive Multi-Rate—Narrowband, AMR-NB), for codec rates in different encoding modes, refer to Table 1. When the voice data is encoded by means of adaptive multirate wideband encoding (Adaptive Multi-Rate—Wideband, AMR-WB), for codec rates in different encoding modes, refer to Table 2.

TABLE 1

| Encoding mode | Codec rate |
| --- | --- |
| 0 | 4.75 kbps |
| 1 | 5.15 kbps |
| 2 | 5.90 kbps |
| 3 | 6.70 kbps |
| 4 | 7.40 kbps |
| 5 | 7.95 kbps |
| 6 | 10.20 kbps |
| 7 | 12.20 kbps |

TABLE 2

| Encoding mode | Codec rate |
|---|---|
| 0 | 6.60 kbps |
| 1 | 8.85 kbps |
| 2 | 12.65 kbps |
| 3 | 14.25 kbps |
| 4 | 15.85 kbps |
| 5 | 18.25 kbps |
| 6 | 19.85 kbps |
| 7 | 23.05 kbps |
| 8 | 23.85 kbps |

It can be seen from Table 1 and Table 2 that, when a codec manner currently used for encoding and decoding the voice data is AMR-NB, when the first statistics value of the VoLTE traffic is greater than or equal to the limiting value of the VoLTE traffic, and the VoLTE service is the VoLTE voice service, the modem may reduce the codec rate of the collected voice data by changing an encoding mode in the current encoding manner. For example, if a currently used encoding mode is 4 (where a corresponding codec rate is 7.40 kbps), when the first statistics value of the VoLTE traffic is greater than or equal to the limiting value of the VoLTE traffic, all voice data that needs to be transmitted is encoded and decoded by using an encoding mode 2. That is, the voice data is encoded and decoded at a codec rate of 5.90 kbps.

When a codec manner currently used for encoding and decoding the voice data is AMR-WB, the codec rate of the collected voice data may be reduced by changing an encoding mode in the current encoding manner, and the codec rate of the collected voice data may also be reduced by changing the current encoding manner. For example, if a current encoding mode is 2 (where a corresponding codec rate is 12.65 kbps), when the first statistics value of the VoLTE traffic is greater than or equal to the limiting value of the VoLTE traffic, voice data that needs to be transmitted may be encoded and decoded by using an encoding mode 1 (where a corresponding codec rate is 8.85 kbps) in the current encoding manner. Alternatively, the current encoding manner may be AMR-NB, and encoding and decoding may be performed by using an encoding mode 7 (where a corresponding codec rate is 12.20 kbps) in the AMR-NB encoding manner.

It should be noted that, when a codec manner currently used for encoding and decoding the voice data is AMR-WB, a specific manner used for reducing the codec rate of the collected voice data may be selected according to a requirement in an actual application scenario, and preset in the modem. The specific manner used for reducing the codec rate of the collected voice data is not specifically limited herein in this embodiment of the present invention.

When the VoLTE service is the VoLTE video service, the modem reduces a transmission parameter of collected video data. The transmission parameter of the video data includes one or more of the following: resolution of image data in the video data, a frame rate of image data in the video data, or a codec rate of voice data in the video data.

Further, by means of SDP negotiation, a remote device communicating with the modem may further be caused to reduce resolution of image data in the collected video data and/or a frame rate of image data in the video data.

It should be noted that, for reducing a codec rate of voice data in collected video data, refer to a specific description of reducing a codec rate of collected voice data in this embodiment of the present invention. Details are not described herein again in this embodiment of the present invention.

It should be noted that, the handover policy in this embodiment of the present invention may also be automatically selected when the modem determines that a congestion occurs in the network, or may be sent to the modem by the AP after a user directly selects to trigger the handover policy to save traffic when the VoLTE traffic does not reach the limiting value of the VoLTE traffic.

Figure 5:
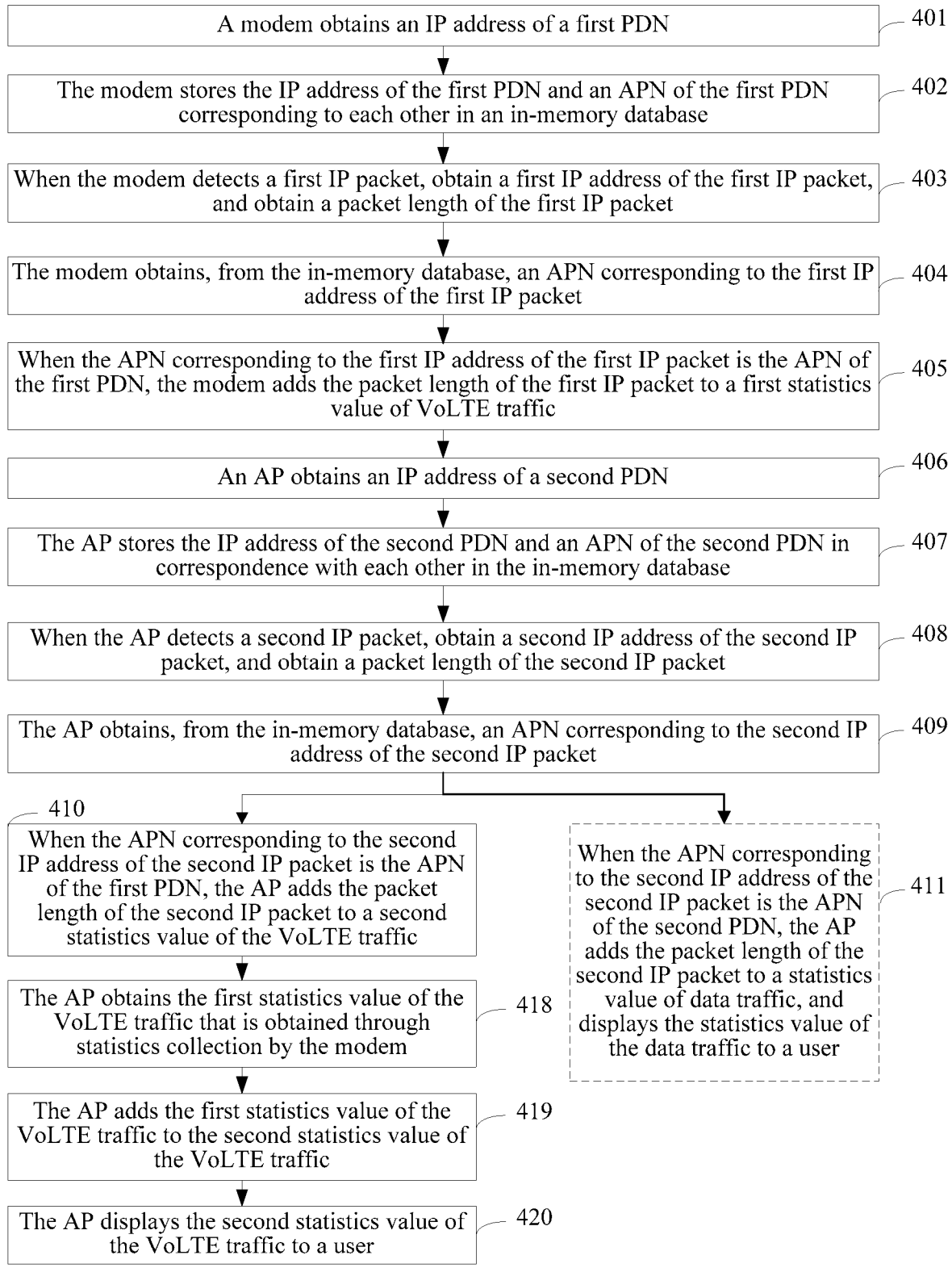
FIG. 5 is a flowchart of another traffic statistics collection method according to another embodiment of the present invention.

Further, to enable displaying of the VoLTE traffic obtained through statistics collection to the user for the user to query, as shown in FIG. 5, if VoLTE services using an IMS protocol stack are deployed on a modem side and an AP side, after step 411 is performed, the method may further include the following step 418 to step 420.

418. The AP obtains the first statistics value of the VoLTE traffic that is obtained through statistics collection by the modem.

There may be two manners in which the AP obtains the first statistics value of the VoLTE traffic that is obtained through statistics collection by the modem.

Manner 1: The AP receives the first statistics value of the VoLTE traffic that is sent by the modem.

The modem may periodically report a first statistics value of the VoLTE traffic that is obtained through statistics collection by the modem, so that the AP may receive the first statistics value of the VoLTE traffic that is sent by the modem.

Manner 2: The AP queries traffic data obtained through statistics collection by the modem, to obtain the first statistics value of the VoLTE traffic.

The AP may proactively query the traffic data obtained through statistics collection by the modem, to obtain the first statistics value of the VoLTE traffic that is obtained through statistics collection by the modem.

419. The AP adds the first statistics value of the VoLTE traffic to the second statistics value of the VoLTE traffic.

After obtaining the first statistics value of the VoLTE traffic that is obtained through statistics collection by the modem, the AP may add the first statistics value of the VoLTE traffic to the second statistics value of the VoLTE traffic, to obtain all generated VoLTE traffic.

420. The AP displays the second statistics value of the VoLTE traffic to a user.

It should be noted that, in this embodiment of the present invention, when VoLTE services using an IMS protocol stack are deployed on a modem side and on an AP side, the second statistics value of the VoLTE traffic that is displayed to the user by the AP in step 420 is a second statistics value that is obtained after the AP adds the first statistics value of the VoLTE traffic that is obtained through statistics collection by the modem to the second statistics value of the VoLTE traffic.

Certainly, if all VoLTE services using an IMS protocol stack are deployed on the modem side, to display the VoLTE traffic that is obtained through statistics collection to the user, after step 405 is performed, step 418 is performed, and the obtained first statistics value of the VoLTE traffic is directly displayed to the user, so as to display the VoLTE traffic to the user, for the user to query.

Further, in this embodiment of the present invention, statistics about VoLTE traffic generated during a call of the user may further be collected. That is, during the call of the user, step 403 to step 405 are performed again, so as to obtain the VoLTE traffic generated during the call of the user. In addition, a first statistics value of the VoLTE traffic that is generated during the call and that is obtained through statistics collection may be sent to the AP, so that the AP displays the VoLTE traffic generated during the call to the user.

Further, in this embodiment of the present invention, statistics about VoLTE traffic generated when a VoLTE voice service is transmitted and VoLTE traffic generated when a VoLTE video service is transmitted may further be separately collected. In an application scenario, when a PDN required by a bearer that establishes a VoLTE voice service and a PDN required by a bearer that establishes a VoLTE video service are the same and are both the first PDN, after step 404 is performed, if the APN corresponding to the first IP address of the first IP packet is the APN of the first PDN, a port number of a port for transmitting the first IP packet may further be determined. When the port number of the port for transmitting the first IP packet is a port number of a port for transmitting the VoLTE voice service, the packet length of the first IP packet is added to a statistics value of VoLTE voice traffic. When the port number of the port for transmitting the first IP packet is a port number of a port for transmitting the VoLTE video service, the packet length of the first IP packet is added to a statistics value of VoLTE video traffic. In another application scenario, when a PDN required by a bearer that establishes a VoLTE voice service and a PDN required by a bearer that establishes a VoLTE video service are different, after step 404 is performed, it may be directly determined whether the APN corresponding to the first IP address of the first IP packet is an APN of the PDN required by a bearer that establishes a VoLTE voice service, or an APN of the PDN required by a bearer that establishes a VoLTE video service. When the APN corresponding to the first IP address of the first IP packet is the APN of the PDN required by a bearer that establishes a VoLTE voice service, the packet length of the first IP packet is added to a statistics value of VoLTE voice traffic. When the APN corresponding to the first IP address of the first IP packet is the APN of the PDN required by a bearer that establishes a VoLTE video service, the packet length of the first IP packet is added to a statistics value of VoLTE video traffic. Certainly, statistics about traffic corresponding to each application or process may further be collected, so as to implement separate statistics collection and separate restriction.

According to the traffic statistics collection method provided in this embodiment of the present invention, when a modem detects a first IP packet, an APN corresponding to an obtained first IP address of the first IP packet is obtained from an in-memory database according to the first IP address of the first IP packet, and when the APN corresponding to the first IP address of the first IP packet is an APN of a PDN required by a bearer that establishes a VoLTE service, an obtained packet length of the first IP packet is added to a first statistics value of VoLTE traffic, so as to collect statistics about the VoLTE traffic. In this way, compared with the prior art in which statistics about traffic on only an AP side can be collected, statistics about traffic generated when a user makes an audio-video call by using an LTE network is collected.

In addition, when an AP detects a second IP packet, an APN corresponding to an obtained second IP address of the second IP packet is obtained from the in-memory database according to the second IP address of the second IP packet, when the APN corresponding to the second IP address of the second IP packet is an APN of a PDN required by a bearer that establishes a VoLTE service, an obtained packet length of the second IP packet is added to a second statistics value of the VoLTE traffic, and when the APN corresponding to the second IP address of the second IP packet is an APN of a PDN required by a bearer that establishes a data service, the obtained packet length of the second IP packet is added to a statistics value of data traffic, so as to separately collect statistics about the data traffic and the VoLTE traffic. Based on this, the data traffic and the VoLTE traffic may be separately restricted, to avoid an incorrect restriction. When the VoLTE traffic is restricted, user traffic can be saved without affecting use of an audio-video service by a user. In addition, multiple handover policies are provided for the user to select. In this way, when the VoLTE traffic is restricted, a VoLTE service may be transmitted according to a selection by the user, thereby improving user experience.

Figure 6:
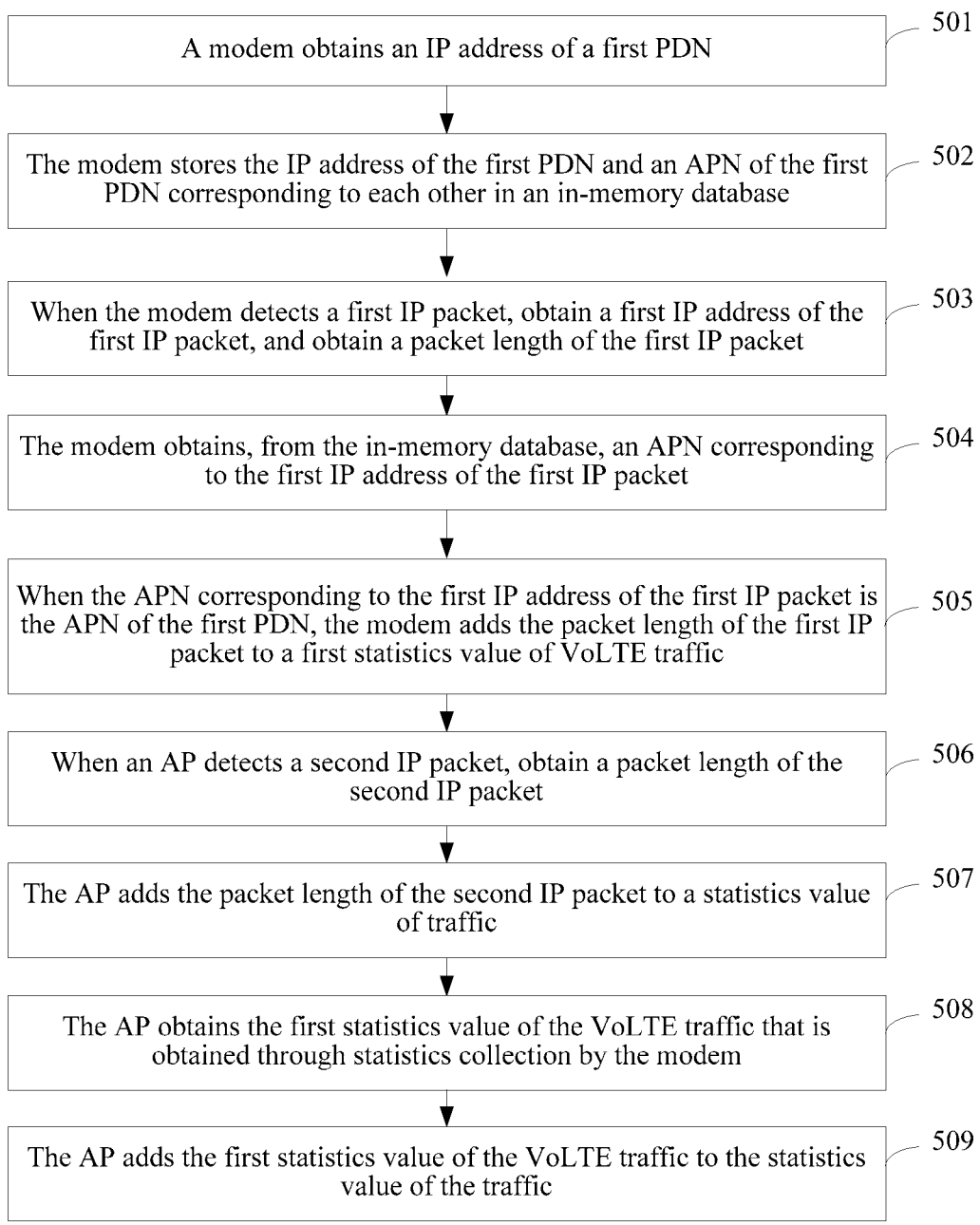
FIG. 6 is a flowchart of a traffic statistics collection method according to another embodiment of the present invention.

Another embodiment of the present invention provides a traffic statistics collection method. As shown in FIG. 6, the method may include the following steps.

501. A modem obtains an IP address of a first PDN.

502. The modem stores the IP address of the first PDN and an APN of the first PDN corresponding to each other in an in-memory database.

503. When the modem detects a first IP packet, obtain a first IP address of the first IP packet, and obtain a packet length of the first IP packet.

504. The modem obtains, from the in-memory database, an APN corresponding to the first IP address of the first IP packet.

After the modem obtains, from the in-memory database, the APN corresponding to the first IP address of the first IP packet, to determine whether traffic generated when the first IP packet is transmitted is VoLTE traffic, the modem may determine whether the obtained APN corresponding to the first IP address of the first IP packet is an APN of a PDN required by a bearer that establishes a VoLTE service, that is, the APN of the first PDN.

505. When the APN corresponding to the first IP address of the first IP packet is the APN of the first PDN, the modem adds the packet length of the first IP packet to a first statistics value of VoLTE traffic.

When the modem determines that the obtained APN corresponding to the first IP address of the first IP packet is not an APN of a PDN required by a bearer that establishes a VoLTE service, that is, when the APN corresponding to the first IP address of the first IP packet is not the APN of the first PDN, the modem does not perform any processing.

506. When an AP detects a second IP packet, obtain a packet length of the second IP packet.

507. The AP adds the packet length of the second IP packet to a statistics value of traffic.

508. The AP obtains the first statistics value of the VoLTE traffic that is obtained through statistics collection by the modem.

Further, in a possible implementation, step 508 may be specifically: receiving, by the AP, the first statistics value of the VoLTE traffic that is sent by the modem. Alternatively, in another possible implementation, step 508 may be specifically: querying, by the AP, traffic data obtained through collection by the modem, to obtain the first statistics value of the VoLTE traffic.

509. The AP adds the first statistics value of the VoLTE traffic to the statistics value of the traffic.

After obtaining the first statistics value of the VoLTE traffic that is obtained through statistics collection by the modem, the AP may add the obtained first statistics value of the VoLTE traffic to the statistics value of the traffic, so as to collect statistics about all the traffic generated when the user uses the user equipment. Further, the AP may further display the statistics value of the traffic that is obtained through statistics collection to the user, making it convenient for the user to query the statistics value of the traffic.

It should be noted that, in this embodiment of the present invention, the statistics value of the traffic that is displayed to the user by the AP is a statistics value of the traffic that is obtained after the AP adds the first statistics value of the VoLTE traffic that is obtained through statistics collection by the modem to the statistics value of the traffic.

It should be noted that, for specific descriptions in step 501 to step 509 in this embodiment of the present invention, refer to specific descriptions of corresponding content in step 401 to step 405 in another embodiment of the present invention and in step 301 to step 304 in another embodiment. Details are not described herein again in this embodiment of the present invention.

According to the traffic statistics collection method provided in this embodiment of the present invention, a modem obtains, through statistics collection, a first statistics value of VoLTE traffic, and when an AP detects a second IP packet, an obtained packet length of the second IP packet is added to a statistics value of traffic, the first statistics value of the VoLTE traffic that is obtained through statistics collection by the modem is obtained, and the first statistics value of the VoLTE traffic is added to the statistics value of the traffic. Compared with the prior art in which statistics about traffic on only an AP side can be collected, completeness of traffic statistics collection is ensured.

Figure 7:
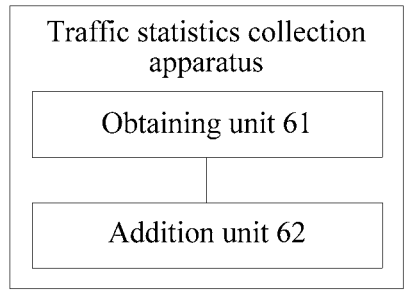
FIG. 7 is a schematic composition diagram of a traffic statistics collection apparatus according to another embodiment of the present invention.

Another embodiment of the present invention provides a traffic statistics collection apparatus. As shown in FIG. 7, the apparatus may include an obtaining unit 61 and an addition unit 62.

The obtaining unit 61 is configured to: when a first Internet Protocol IP packet is detected, obtain a first IP address of the first IP packet, obtain a packet length of the first IP packet, and obtain, from an in-memory database, an access point name APN corresponding to the first IP address of the first IP packet.

The addition unit 62 is configured to: when the APN that corresponds to the first IP address of the first IP packet and that is obtained by the obtaining unit 61 is an APN of a first public data network PDN, add the packet length of the first IP packet to a first statistics value of voice over Long Term Evolution LTE VoLTE traffic, where the first PDN is a PDN required by a bearer that establishes a VoLTE service.

In this embodiment of the present invention, further, the obtaining unit 61 is further configured to obtain an IP address of the first PDN before the first Internet Protocol IP packet is detected.

Figure 8:
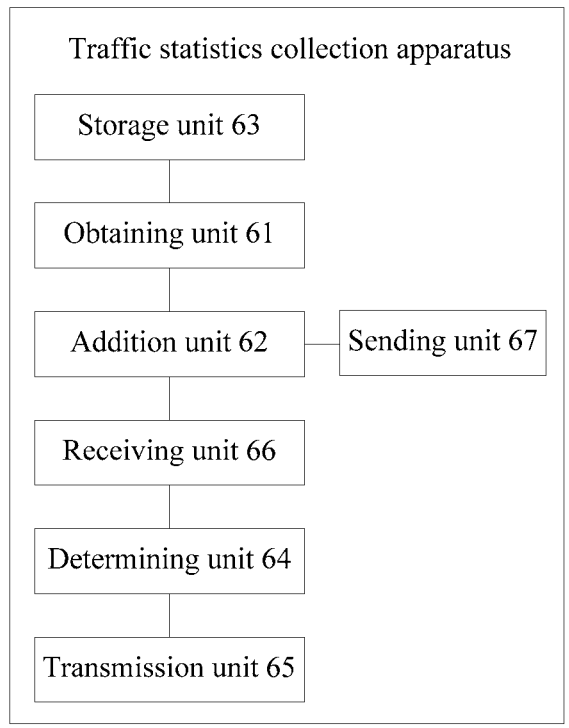
FIG. 8 is a schematic composition diagram of another traffic statistics collection apparatus according to another embodiment of the present invention.

As shown in FIG. 8, the apparatus may further include a storage unit 63.

The storage unit 63 is configured to store the IP address of the first PDN that is obtained by the obtaining unit 61 and the APN of the first PDN corresponding to each other in the in-memory database.

In this embodiment of the present invention, further, when the first IP packet is a packet received by the traffic statistics collection apparatus, the first IP address is a source IP address of the first IP packet. When the first IP packet is a packet that needs to be sent to a network side by the traffic statistics collection apparatus, the first IP address is a destination IP address of the first IP packet.

In this embodiment of the present invention, further, the obtaining unit 61 is further configured to obtain a second statistics value of the VoLTE traffic that is obtained through statistics collection by an application processor AP.

The addition unit 62 is further configured to add the second statistics value of the VoLTE traffic that is obtained by the obtaining unit 61 to the first statistics value of the VoLTE traffic.

In this embodiment of the present invention, further, the obtaining unit 61 is specifically configured to: receive the second statistics value of the VoLTE traffic that is sent by the AP; or query traffic data obtained through statistics collection by the AP, to obtain the second statistics value of the VoLTE traffic.

In this embodiment of the present invention, further, the obtaining unit 61 is specifically configured to: send a first PDN registration request to a network side, where the first PDN registration request includes the APN of the first PDN, so that the network side obtains the IP address of the first PDN according to the APN of the first PDN; and receive the IP address of the first PDN that is sent by the network side.

In this embodiment of the present invention, further, the apparatus may further include a determining unit 64 and a transmission unit 65.

The determining unit 64 is configured to determine whether the first statistics value of the VoLTE traffic is greater than or equal to a limiting value of the VoLTE traffic.

The transmission unit 65 is configured to: when the determining unit 64 determines that the first statistics value of the VoLTE traffic is greater than or equal to the limiting value of the VoLTE traffic, transmit a VoLTE service according to a handover policy, where the VoLTE service is a VoLTE voice service or a VoLTE video service.

In this embodiment of the present invention, further, the apparatus may further include a receiving unit 66.

The receiving unit 66 is configured to: before the determining unit 64 determines whether the first statistics value of the VoLTE traffic is greater than or equal to a limiting value of the VoLTE traffic, receive the limiting value of the VoLTE traffic that is sent by the AP.

In this embodiment of the present invention, further, the receiving unit 66 is further configured to: before the transmission unit 65 transmits the VoLTE service according to the handover policy, receive the handover policy sent by the AP, where the handover policy is sent by the AP after the AP receives a selection trigger of a user for the handover policy.

In this embodiment of the present invention, further, the handover policy is: when the first statistics value of the VoLTE traffic is greater than or equal to the limiting value of the VoLTE traffic, transmission of the VoLTE voice service and transmission of the VoLTE video service are both unrestricted.

The transmission unit 65 is specifically configured to: when the VoLTE service is the VoLTE voice service, transmit collected voice data by using an LTE network; and when the VoLTE service is the VoLTE video service, transmit collected voice data and image data by using the LTE network.

In this embodiment of the present invention, further, the handover policy is: when the first statistics value of the VoLTE traffic is greater than or equal to the limiting value of the VoLTE traffic, transmission of the VoLTE voice service is unrestricted, and transmission of the VoLTE video service is restricted.

The transmission unit 65 is specifically configured to: when the VoLTE service is the VoLTE voice service, transmit collected voice data by using an LTE network; and when the VoLTE service is the VoLTE video service, switch a video mode to a voice mode, and transmit collected voice data by using the LTE network.

In this embodiment of the present invention, further, the handover policy is: when the first statistics value of the VoLTE traffic is greater than or equal to the limiting value of the VoLTE traffic, transmission of the VoLTE voice service and transmission of the VoLTE video service are both restricted.

The transmission unit 65 is specifically configured to: when the VoLTE service is the VoLTE voice service, perform a handover from an LTE network to a 2nd generation mobile communications technology 2G/3rd generation mobile communications technology 3G network, and transmit collected voice data by using a circuit switched CS domain or a packet switched PS domain; and when the VoLTE service is the VoLTE video service, switch a video mode to a voice mode, and transmit collected voice data by using the CS domain or the PS domain.

In this embodiment of the present invention, further, the handover policy is: when the first statistics value of the VoLTE traffic is greater than or equal to the limiting value of the VoLTE traffic, reducing a codec rate of the VoLTE voice service, and reducing a transmission parameter of the VoLTE video service.

The transmission unit 65 is specifically configured to: when the VoLTE service is the VoLTE voice service, reduce a codec rate of collected voice data; and when the VoLTE service is the VoLTE video service, reduce a transmission parameter of collected video data.

The transmission parameter of the video data includes one or more of the following: resolution of image data in the video data, a frame rate of image data in the video data, or a codec rate of voice data in the video data.

In this embodiment of the present invention, further, the apparatus may further include a sending unit 67.

The sending unit is configured to: after the addition unit 62 adds the packet length of the first IP packet to the first statistics value of the voice over Long Term Evolution LTE VoLTE traffic, send the first statistics value of the VoLTE traffic that is obtained by the addition unit 62 to the AP.

It should be noted that, for specific working processes of the functional modules in the traffic statistics collection apparatus in this embodiment of the present invention, refer to specific descriptions of a corresponding process in the method embodiment, and details are not described in this embodiment of the present invention again.

According to the traffic statistics collection apparatus provided in this embodiment of the present invention, when a first IP packet is detected, an APN corresponding to an obtained first IP address of the first IP packet is obtained from an in-memory database according to the first IP address of the first IP packet, and when the APN corresponding to the first IP address of the first IP packet is an APN of a PDN required by a bearer that establishes a VoLTE service, an obtained packet length of the first IP packet is added to a first statistics value of VoLTE traffic, so as to collect statistics about the VoLTE traffic. In this way, compared with the prior art in which statistics about traffic on only an AP side can be collected, statistics about traffic generated when a user makes an audio-video call by using an LTE network is collected.

In addition, when an AP detects a second IP packet, an APN corresponding to an obtained second IP address of the second IP packet is obtained from the in-memory database according to the second IP address of the second IP packet, when the APN corresponding to the second IP address of the second IP packet is an APN of a PDN required by a bearer that establishes a VoLTE service, an obtained packet length of the second IP packet is added to a second statistics value of the VoLTE traffic, and when the APN corresponding to the second IP address of the second IP packet is an APN of a PDN required by a bearer that establishes a data service, the obtained packet length of the second IP packet is added to a statistics value of data traffic, so as to separately collect statistics about the data traffic and the VoLTE traffic. Based on this, the data traffic and the VoLTE traffic may be separately restricted, to avoid an incorrect restriction. When the VoLTE traffic is restricted, user traffic can be saved without affecting use of an audio-video service by a user. In addition, multiple handover policies are provided for the user to select. In this way, when the VoLTE traffic is restricted, a VoLTE service may be transmitted according to a selection by the user, thereby improving user experience.

Figure 9:
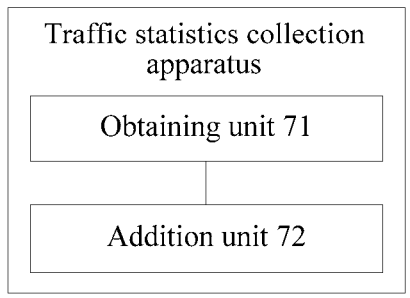
FIG. 9 is a schematic composition diagram of a traffic statistics collection apparatus according to another embodiment of the present invention.

Another embodiment of the present invention provides a traffic statistics collection apparatus. As shown in FIG. 9, the apparatus may include an obtaining unit 71 and an addition unit 72.

The obtaining unit 71 is configured to: when a second Internet Protocol IP packet is detected, obtain a second IP address of the second IP packet, obtain a packet length of the second IP packet, and obtain, from an in-memory database, an access point name APN corresponding to the second IP address of the second IP packet.

The addition unit 72 is configured to: when the APN that corresponds to the second IP address of the second IP packet and that is obtained by the obtaining unit 71 is an APN of a first public data network PDN, add the packet length of the second IP packet to a second statistics value of voice over Long Term Evolution LTE VoLTE traffic, where the first PDN is a PDN required by a bearer that establishes a VoLTE service.

In this embodiment of the present invention, further, when the second IP packet is a packet received by the traffic statistics collection apparatus, the second IP address is a source IP address of the second IP packet. When the second IP packet is a packet that needs to be sent to a network side by the traffic statistics collection apparatus, the second IP address is a destination IP address of the second IP packet.

Figure 10:
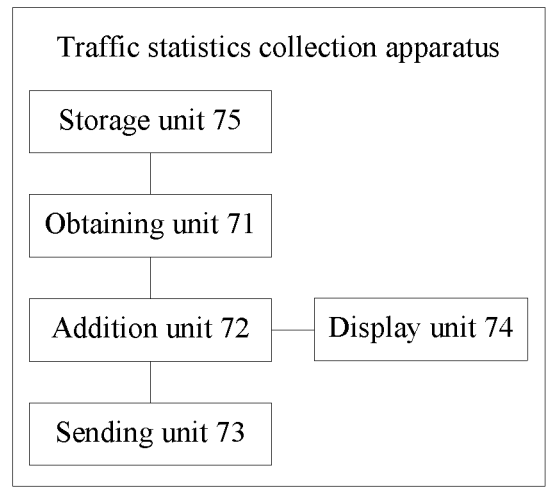
FIG. 10 is a schematic composition diagram of another traffic statistics collection apparatus according to another embodiment of the present invention.

In this embodiment of the present invention, further, as shown in FIG. 10, the apparatus may further include a sending unit 73.

The sending unit 73 is configured to: after the addition unit 72 adds the packet length of the IP packet to the second statistics value of the voice over Long Term Evolution LTE VoLTE traffic, send the second statistics value of the VoLTE traffic to a modem.

In this embodiment of the present invention, further, the obtaining unit 71 is further configured to obtain a first statistics value of the VoLTE traffic that is obtained through statistics collection by the modem.

The addition unit 72 is further configured to add the first statistics value of the VoLTE traffic to the second statistics value of the VoLTE traffic.

The apparatus may further include a display unit 74.

The display unit 74 is configured to display the second statistics value of the VoLTE traffic that is obtained by the addition unit 72 to a user.

In this embodiment of the present invention, further, the obtaining unit 71 is specifically configured to: receive the first statistics value of the VoLTE traffic that is sent by the modem; or query traffic data obtained through statistics collection by the modem, to obtain the first statistics value of the VoLTE traffic.

In this embodiment of the present invention, further, the addition unit 72 is further configured to: when the APN that corresponds to the second IP address of the second IP packet and that is obtained by the obtaining unit 71 is an APN of a second PDN, add the packet length of the second IP packet to a statistics value of data traffic. The second PDN is a PDN required by a bearer that establishes a data service.

The display unit 74 is further configured to display the statistics value of the data traffic that is obtained by the addition unit 72 to the user.

In this embodiment of the present invention, further, the obtaining unit 71 is further configured to obtain an IP address of the second PDN before the obtaining unit 71 detects the second Internet Protocol IP packet.

The apparatus may further include a storage unit 75.

The storage unit 75 is configured to store the IP address of the second PDN that is obtained by the obtaining unit 71 and the APN of the second PDN corresponding to each other in the in-memory database.

In this embodiment of the present invention, further, the obtaining unit 71 is specifically configured to: send a second PDN registration request to a network side by using the modem, where the second PDN registration request includes the APN of the second PDN, so that the network side obtains the IP address of the second PDN according to the APN of the second PDN; and receive the IP address of the second PDN that is sent by the network side by using the modem.

It should be noted that, for specific working processes of the functional modules in the traffic statistics collection in this embodiment of the present invention, refer to specific descriptions of a corresponding process in the method embodiment, and details are not described in this embodiment of the present invention again.

According to the traffic statistics collection apparatus provided in this embodiment of the present invention, when a first IP packet is detected, an APN corresponding to an obtained first IP address of the first IP packet is obtained from an in-memory database according to the first IP address of the first IP packet, and when the APN corresponding to the first IP address of the first IP packet is an APN of a PDN required by a bearer that establishes a VoLTE service, an obtained packet length of the first IP packet is added to a first statistics value of VoLTE traffic, so as to collect statistics about the VoLTE traffic. In this way, compared with the prior art in which statistics about traffic on only an AP side can be collected, statistics about traffic generated when a user makes an audio-video call by using an LTE network is collected.

In addition, when an AP detects a second IP packet, an APN corresponding to an obtained second IP address of the second IP packet is obtained from the in-memory database according to the second IP address of the second IP packet, when the APN corresponding to the second IP address of the second IP packet is an APN of a PDN required by a bearer that establishes a VoLTE service, an obtained packet length of the second IP packet is added to a second statistics value of the VoLTE traffic, and when the APN corresponding to the second IP address of the second IP packet is an APN of a PDN required by a bearer that establishes a data service, the obtained packet length of the second IP packet is added to a statistics value of data traffic, so as to separately collect statistics about the data traffic and the VoLTE traffic. Based on this, the data traffic and the VoLTE traffic may be separately restricted, to avoid an incorrect restriction. When the VoLTE traffic is restricted, user traffic can be saved without affecting use of an audio-video service by a user. In addition, multiple handover policies are provided for the user to select. In this way, when the VoLTE traffic is restricted, a VoLTE service may be transmitted according to a selection by the user, thereby improving user experience.

Figure 11:
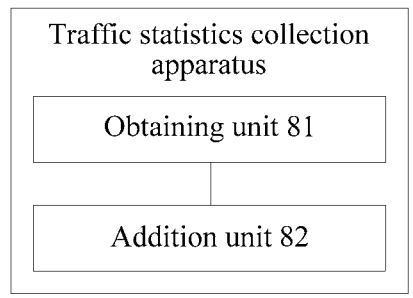
FIG. 11 is a schematic composition diagram of a traffic statistics collection apparatus according to another embodiment of the present invention.

Another embodiment of the present invention provides a traffic statistics collection apparatus. As shown in FIG. 11, the apparatus may include an obtaining unit 81 and an addition unit 82.

The obtaining unit 81 is configured to: when a second Internet Protocol IP packet is detected, obtain a packet length of the second IP packet.

The addition unit 82 is configured to add the packet length of the second IP packet that is obtained by the obtaining unit 81 to a statistics value of traffic.

The obtaining unit 81 is further configured to obtain a first statistics value of voice over Long Term Evolution LTE VoLTE traffic that is obtained through statistics collection by a modem.

The addition unit 82 is further configured to add the first statistics value of the VoLTE traffic that is obtained by the obtaining unit 81 to the statistics value of the traffic.

In this embodiment of the present invention, further, the obtaining unit 81 is specifically configured to: receive the first statistics value of the VoLTE traffic that is sent by the modem; or query traffic data obtained through statistics collection by the modem, to obtain the first statistics value of the VoLTE traffic.

It should be noted that, for specific working processes of the functional modules in the traffic statistics collection in this embodiment of the present invention, refer to specific descriptions of a corresponding process in the method embodiment, and details are not described in this embodiment of the present invention again.

According to the traffic statistics collection apparatus provided in this embodiment of the present invention, a first statistics value of VoLTE traffic is obtained through statistics collection, and when an AP detects a second IP packet, an obtained packet length of the second IP packet is added to a statistics value of traffic, the first statistics value of the VoLTE traffic that is obtained through statistics collection by the modem is obtained, and the first statistics value of the VoLTE traffic is added to the statistics value of the traffic. Compared with the prior art in which statistics about traffic on only an AP side can be collected, completeness of traffic statistics collection is ensured.

Figure 12:
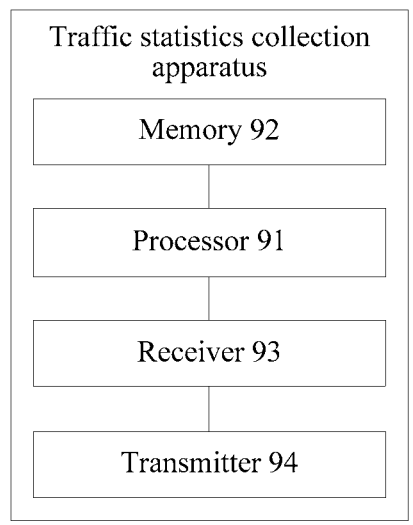
FIG. 12 is a schematic composition diagram of a traffic statistics collection apparatus according to another embodiment of the present invention.

An embodiment of the present invention provides a traffic statistics collection apparatus. As shown in FIG. 12, the apparatus may include a processor 91.

The processor 91 is configured to: when a first Internet Protocol IP packet is detected, obtain a first IP address of the first IP packet, obtain a packet length of the first IP packet, obtain, from an in-memory database, an access point name APN corresponding to the first IP address of the first IP packet, and when the APN corresponding to the first IP address of the first IP packet is an APN of a first public data network PDN, add the packet length of the first IP packet to a first statistics value of voice over Long Term Evolution LTE VoLTE traffic, where the first PDN is a PDN required by a bearer that establishes a VoLTE service.

In this embodiment of the present invention, further, the processor 91 is further configured to obtain an IP address of the first PDN before the first Internet Protocol IP packet is detected.

The apparatus may further include a memory 92.

The memory 92 is configured to store the IP address of the first PDN that is obtained by the processor 91 and the APN of the first PDN corresponding to each other in the in-memory database.

In this embodiment of the present invention, further, when the first IP packet is a packet received by the traffic statistics collection apparatus, the first IP address is a source IP address of the first IP packet. When the first IP packet is a packet that needs to be sent to a network side by the traffic statistics collection apparatus, the first IP address is a destination IP address of the first IP packet.

In this embodiment of the present invention, further, the processor 91 is further configured to: obtain a second statistics value of the VoLTE traffic that is obtained through statistics collection by an application processor AP, and add the second statistics value of the VoLTE traffic to the first statistics value of the VoLTE traffic.

In this embodiment of the present invention, further, the apparatus may further include a receiver 93, configured to receive the second statistics value of the VoLTE traffic that is sent by the AP.

Alternatively, the processor 91 is specifically configured to query traffic data obtained through statistics collection by the AP, to obtain the second statistics value of the VoLTE traffic.

In this embodiment of the present invention, further, the apparatus may further include a transmitter 94, configured to send a first PDN registration request to a network side. The first PDN registration request includes the APN of the first PDN, so that the network side obtains the IP address of the first PDN according to the APN of the first PDN.

The receiver 94 is further configured to receive the IP address of the first PDN that is sent by the network side.

In this embodiment of the present invention, further, the processor 91 is further configured to: determine whether the first statistics value of the VoLTE traffic is greater than or equal to a limiting value of the VoLTE traffic, and when the first statistics value of the VoLTE traffic is greater than or equal to the limiting value of the VoLTE traffic, transmit a VoLTE service according to a handover policy, where the VoLTE service is a VoLTE voice service or a VoLTE video service.

In this embodiment of the present invention, further, the receiver 94 is further configured to: before the processor 91 determines whether the first statistics value of the VoLTE traffic is greater than or equal to a limiting value of the VoLTE traffic, receive the limiting value of the VoLTE traffic that is sent by the AP.

In this embodiment of the present invention, further, the receiver 94 is further configured to: before the processor 91 transmits the VoLTE service according to the handover policy, receive the handover policy sent by the AP. The handover policy is sent by the AP after the AP receives a selection trigger of a user for the handover policy.

In this embodiment of the present invention, further, the handover policy is: when the first statistics value of the VoLTE traffic is greater than or equal to the limiting value of the VoLTE traffic, transmission of the VoLTE voice service and transmission of the VoLTE video service are both unrestricted.

The processor 91 is specifically configured to: when the VoLTE service is the VoLTE voice service, transmit collected voice data by using an LTE network; and when the VoLTE service is the VoLTE video service, transmit collected voice data and image data by using the LTE network.

In this embodiment of the present invention, further, the handover policy is: when the first statistics value of the VoLTE traffic is greater than or equal to the limiting value of the VoLTE traffic, transmission of the VoLTE voice service is unrestricted, and transmission of the VoLTE video service is restricted.

The processor 91 is specifically configured to: when the VoLTE service is the VoLTE voice service, transmit collected voice data by using an LTE network; and when the VoLTE service is the VoLTE video service, switch a video mode to a voice mode, and transmit collected voice data by using the LTE network.

In this embodiment of the present invention, further, the handover policy is: when the first statistics value of the VoLTE traffic is greater than or equal to the limiting value of the VoLTE traffic, transmission of the VoLTE voice service and transmission of the VoLTE video service are both restricted.

The processor 91 is specifically configured to: when the VoLTE service is the VoLTE voice service, perform a handover from an LTE network to a 2nd generation mobile communications technology 2G/3rd generation mobile communications technology 3G network, and transmit collected voice data by using a circuit switched CS domain or a packet switched PS domain; and when the VoLTE service is the VoLTE video service, switch a video mode to a voice mode, and transmit collected voice data by using the CS domain or the PS domain.

In this embodiment of the present invention, further, the handover policy is: when the first statistics value of the VoLTE traffic is greater than or equal to the limiting value of the VoLTE traffic, reducing a codec rate of the VoLTE voice service, and reducing a transmission parameter of the VoLTE video service.

The processor 91 is specifically configured to: when the VoLTE service is the VoLTE voice service, reduce a codec rate of collected voice data; and when the VoLTE service is the VoLTE video service, reduce a transmission parameter of collected video data.

The transmission parameter of the video data includes one or more of the following: resolution of image data in the video data, a frame rate of image data in the video data, or a codec rate of voice data in the video data.

In this embodiment of the present invention, further, the transmitter 94 is further configured to: after the processor 91 adds the packet length of the first IP packet to the first statistics value of the voice over Long Term Evolution LTE VoLTE traffic, send the first statistics value of the VoLTE traffic that is obtained by the processor 91 to the AP.

It should be noted that, for specific working processes of the functional modules in the traffic statistics collection in this embodiment of the present invention, refer to specific descriptions of a corresponding process in the method embodiment, and details are not described in this embodiment of the present invention again.

According to the traffic statistics collection apparatus provided in this embodiment of the present invention, when a first IP packet is detected, an APN corresponding to an obtained first IP address of the first IP packet is obtained from an in-memory database according to the first IP address of the first IP packet, and when the APN corresponding to the first IP address of the first IP packet is an APN of a PDN required by a bearer that establishes a VoLTE service, an obtained packet length of the first IP packet is added to a first statistics value of VoLTE traffic, so as to collect statistics about the VoLTE traffic. In this way, compared with the prior art in which statistics about traffic on only an AP side can be collected, statistics about traffic generated when a user makes an audio-video call by using an LTE network is collected.

In addition, when an AP detects a second IP packet, an APN corresponding to an obtained second IP address of the second IP packet is obtained from the in-memory database according to the second IP address of the second IP packet, when the APN corresponding to the second IP address of the second IP packet is an APN of a PDN required by a bearer that establishes a VoLTE service, an obtained packet length of the second IP packet is added to a second statistics value of the VoLTE traffic, and when the APN corresponding to the second IP address of the second IP packet is an APN of a PDN required by a bearer that establishes a data service, the obtained packet length of the second IP packet is added to a statistics value of data traffic, so as to separately collect statistics about the data traffic and the VoLTE traffic. Based on this, the data traffic and the VoLTE traffic may be separately restricted, to avoid an incorrect restriction. When the VoLTE traffic is restricted, user traffic can be saved without affecting use of an audio-video service by a user. In addition, multiple handover policies are provided for the user to select. In this way, when the VoLTE traffic is restricted, a VoLTE service may be transmitted according to a selection by the user, thereby improving user experience.

Figure 13:
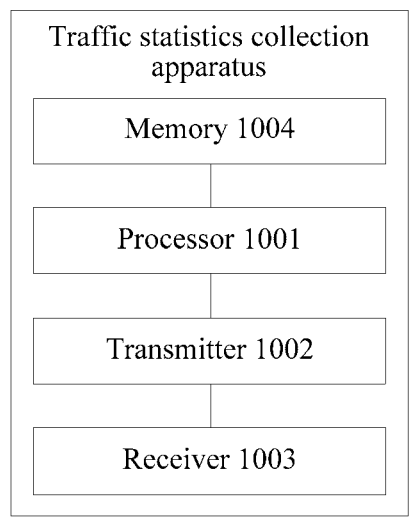
FIG. 13 is a schematic composition diagram of a traffic statistics collection apparatus according to another embodiment of the present invention.

Another embodiment of the present invention provides a traffic statistics collection apparatus. As shown in FIG. 13, the apparatus may include a processor 1001.

The processor 1001 is configured to: when a second Internet Protocol IP packet is detected, obtain a second IP address of the second IP packet, obtain a packet length of the second IP packet, obtain, from an in-memory database, an access point name APN corresponding to the second IP address of the second IP packet, and when the APN corresponding to the second IP address of the second IP packet is an APN of a first public data network PDN, add the packet length of the second IP packet to a second statistics value of voice over Long Term Evolution LTE VoLTE traffic, where the first PDN is a PDN required by a bearer that establishes a VoLTE service.

In this embodiment of the present invention, further, when the second IP packet is a packet received by the traffic statistics collection apparatus, the second IP address is a source IP address of the second IP packet. When the second IP packet is a packet that needs to be sent to a network side by the traffic statistics collection apparatus, the second IP address is a destination IP address of the second IP packet.

In this embodiment of the present invention, further, the apparatus may further include a transmitter 1002.

The transmitter 1002 is configured to: after the processor 1001 adds the packet length of the IP packet to the second statistics value of the voice over Long Term Evolution LTE VoLTE traffic, send the second statistics value of the VoLTE traffic to a modem.

In this embodiment of the present invention, further, the processor 1001 is further configured to: obtain a first statistics value of the VoLTE traffic that is obtained through statistics collection by the modem, add the first statistics value of the VoLTE traffic to the second statistics value of the VoLTE traffic, and display the second statistics value of the VoLTE traffic to a user.

In this embodiment of the present invention, further, the apparatus may further include a receiver 1003, further configured to receive the first statistics value of the VoLTE traffic that is sent by the modem.

Alternatively, the processor 1001 is specifically configured to query traffic data obtained through statistics collection by the modem, to obtain the first statistics value of the VoLTE traffic.

In this embodiment of the present invention, further, the processor 1001 is further configured to: when the APN corresponding to the second IP address of the second IP packet is an APN of a second PDN, add the packet length of the second IP packet to a statistics value of data traffic, and display the statistics value of the data traffic to the user, where the second PDN is a PDN required by a bearer that establishes a data service.

In this embodiment of the present invention, further, the processor 1001 is further configured to obtain an IP address of the second PDN before the second Internet Protocol IP packet is detected.

The apparatus may further include a memory 1004.

The memory 1004 is configured to store the IP address of the second PDN that is obtained by the processor 1001 and the APN of the second PDN corresponding to each other in the in-memory database.

In this embodiment of the present invention, further, the transmitter 1002 is further configured to send a second PDN registration request to a network side by using the modem. The second PDN registration request includes the APN of the second PDN, so that the network side obtains the IP address of the second PDN according to the APN of the second PDN.

The receiver 1003 is further configured to receive the IP address of the second PDN that is sent by the network side by using the modem.

It should be noted that, for specific working processes of the functional modules in the traffic statistics collection in this embodiment of the present invention, refer to specific descriptions of a corresponding process in the method embodiment, and details are not described in this embodiment of the present invention again.

According to the traffic statistics collection apparatus provided in this embodiment of the present invention, when a first IP packet is detected, an APN corresponding to an obtained first IP address of the first IP packet is obtained from an in-memory database according to the first IP address of the first IP packet, and when the APN corresponding to the first IP address of the first IP packet is an APN of a PDN required by a bearer that establishes a VoLTE service, an obtained packet length of the first IP packet is added to a first statistics value of VoLTE traffic, so as to collect statistics about the VoLTE traffic. In this way, compared with the prior art in which statistics about traffic on only an AP side can be collected, statistics about traffic generated when a user makes an audio-video call by using an LTE network is collected.

In addition, when an AP detects a second IP packet, an APN corresponding to an obtained second IP address of the second IP packet is obtained from the in-memory database according to the second IP address of the second IP packet, when the APN corresponding to the second IP address of the second IP packet is an APN of a PDN required by a bearer that establishes a VoLTE service, an obtained packet length of the second IP packet is added to a second statistics value of the VoLTE traffic, and when the APN corresponding to the second IP address of the second IP packet is an APN of a PDN required by a bearer that establishes a data service, the obtained packet length of the second IP packet is added to a statistics value of data traffic, so as to separately collect statistics about the data traffic and the VoLTE traffic. Based on this, the data traffic and the VoLTE traffic may be separately restricted, to avoid an incorrect restriction. When the VoLTE traffic is restricted, user traffic can be saved without affecting use of an audio-video service by a user. In addition, multiple handover policies are provided for the user to select. In this way, when the VoLTE traffic is restricted, a VoLTE service may be transmitted according to a selection by the user, thereby improving user experience.

Figure 14:
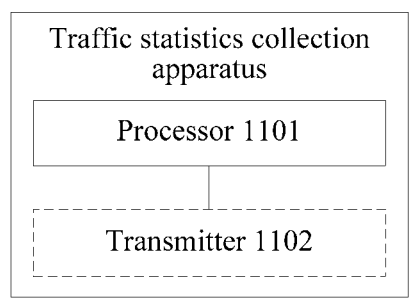
FIG. 14 is a schematic composition diagram of a traffic statistics collection apparatus according to another embodiment of the present invention.

Another embodiment of the present invention provides a traffic statistics collection apparatus. As shown in FIG. 14, the apparatus may include a processor 1101.

The processor 1101 is configured to: when a second Internet Protocol IP packet is detected, obtain a packet length of the second IP packet, add the packet length of the second IP packet to a statistics value of traffic, obtain a first statistics value of voice over Long Term Evolution LTE VoLTE traffic that is obtained through statistics collection by a modem, and add the first statistics value of the VoLTE traffic to the statistics value of the traffic.

In this embodiment of the present invention, further, the apparatus may further include a transmitter 1102, configured to receive the first statistics value of the VoLTE traffic that is sent by the modem.

Alternatively, the processor 1101 is specifically configured to query traffic data obtained through statistics collection by the modem, to obtain the first statistics value of the VoLTE traffic.

It should be noted that, for specific working processes of the functional modules in the traffic statistics collection in this embodiment of the present invention, refer to specific descriptions of a corresponding process in the method embodiment, and details are not described in this embodiment of the present invention again.

According to the traffic statistics collection apparatus provided in this embodiment of the present invention, a first statistics value of VoLTE traffic is obtained through statistics collection, and when an AP detects a second IP packet, an obtained packet length of the second IP packet is added to a statistics value of traffic, the first statistics value of the VoLTE traffic that is obtained through statistics collection by the modem is obtained, and the first statistics value of the VoLTE traffic is added to the statistics value of the traffic. Compared with the prior art in which statistics about traffic on only an AP side can be collected, completeness of traffic statistics collection is ensured.

Figure 15:
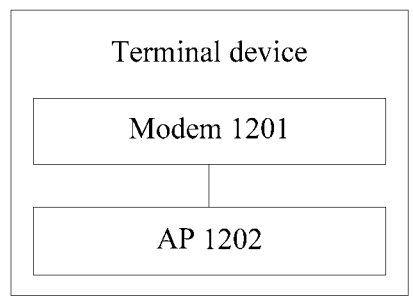
FIG. 15 is a schematic composition diagram of a terminal device according to another embodiment of the present invention.

Another embodiment of the present invention provides a terminal device. As shown in FIG. 15, the terminal device may include:

a modem 1201, configured to: when a first IP packet is detected, obtain a first IP address of the first IP packet, obtain a packet length of the first IP packet, obtain, from an in-memory database, an access point name APN corresponding to the first IP address of the first IP packet, and when the APN corresponding to the first IP address of the first IP packet is an APN of a first public data network PDN, add the packet length of the first IP packet to a first statistics value of voice over Long Term Evolution LTE VoLTE traffic; and an AP 1202, configured to: when a second IP packet is detected, obtain a second IP address of the second IP packet, obtain a packet length of the second IP packet, obtain, from the in-memory database, an APN corresponding to the second IP address of the second IP packet, and when the APN corresponding to the second IP address of the second IP packet is an APN of the first PDN, add the packet length of the second IP packet to a second statistics value of the VoLTE traffic.

The first PDN is a PDN required by a bearer that establishes a VoLTE service.

According to the terminal device provided in this embodiment of the present invention, when a modem detects a first IP packet, an APN corresponding to an obtained first IP address of the first IP packet is obtained from an in-memory database according to the first IP address of the first IP packet, and when the APN corresponding to the first IP address of the first IP packet is an APN of a PDN required by a bearer that establishes a VoLTE service, an obtained packet length of the first IP packet is added to a first statistics value of VoLTE traffic, so as to collect statistics about the VoLTE traffic. In this way, compared with the prior art in which statistics about traffic on only an AP side can be collected, statistics about traffic generated when a user makes an audio-video call by using an LTE network is collected.

The foregoing descriptions about implementation manners allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in the present application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units maybe selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A traffic statistics collection method, comprising:
when a modem detects a Internet Protocol (IP) packet, obtaining a first IP address of the first IP packet and a packet length of the first IP packet;
obtaining, by the modem from an in-memory database, an access point name (APN) corresponding to the first IP address of the first IP packet; and
when the APN corresponding to the first IP address of the first IP packet is an APN of a first public data network (PDN), adding, by the modem, the packet length of the first IP packet to a first statistics value of voice over Long Term Evolution (VoLTE) traffic, wherein the first PDN is a PDN required by a bearer that establishes a VoLTE service;
determining, by the modem, whether the first statistics value of the VoLTE traffic is greater than or equal to a limiting value of the VoLTE traffic;
when the first statistics value of the VoLTE traffic is greater than or equal to the limiting value of the VoLTE traffic, transmitting, by the modem, a VoLTE service according to a handover policy, wherein the VoLTE service is a VoLTE voice service or a VoLTE video service; and
when the handover policy is a first handover policy:
the first handover policy is: when the first statistics value of the VoLTE traffic is greater than or equal to the limiting value of the VoLTE traffic, transmission of the VoLTE voice service and transmission of the VoLTE video service are both unrestricted; and
transmitting, by the modem, a VoLTE service according to the first handover policy comprises:
when the VoLTE service is the VoLTE voice service, transmitting, by the modem, collected voice data by using an LTE network; and
when the VoLTE service is the VoLTE video service, transmitting, by the modem, collected voice data and image data by using the LTE network.

2. The method according to claim 1, wherein before detecting, by the modem, a first Internet Protocol (IP) packet, the method further comprises:
obtaining, by the modem, an IP address of the first PDN;
storing, by the modem, the IP address of the first PDN and the APN of the first PDN corresponding to each other in the in-memory database; and
wherein obtaining, by the modem, an IP address of the first PDN comprises:
sending, by the modem, a first PDN registration request to a network side, wherein the first PDN registration request comprises the APN of the first PDN, so that the network side obtains the IP address of the first PDN according to the APN of the first PDN, and
receiving, by the modem, the IP address of the first PDN that is sent by the network side.

3. The method according to claim 1, wherein the method further comprises:
obtaining, by the modem, a second statistics value of the VoLTE traffic that is obtained through statistics collection by an application processor (AP); and
adding, by the modem, the second statistics value of the VoLTE traffic to the first statistics value of the VoLTE traffic.

4. The method according to claim 3, wherein obtaining, by the modem, a second statistics value of the VoLTE traffic that is obtained through statistics collection by an application processor (AP) comprises:
receiving, by the modem, the second statistics value of the VoLTE traffic that is sent by the AP; or
querying, by the modem, traffic data obtained through statistics collection by the AP, to obtain the second statistics value of the VoLTE traffic.

5. The method according to claim 1, wherein:
when the handover policy is a second handover policy:
the second handover policy is: when the first statistics value of the VoLTE traffic is greater than or equal to the limiting value of the VoLTE traffic, transmission of the VoLTE voice service is unrestricted, and transmission of the VoLTE video service is restricted; and
transmitting, by the modem, a VoLTE service according to the second handover policy comprises:
when the VoLTE service is the VoLTE voice service, transmitting, by the modem, collected voice data by using an LTE network; and
when the VoLTE service is the VoLTE video service, switching, by the modem, a video mode to a voice mode, and transmitting collected voice data by using the LTE network.

6. The method according to claim 1, wherein:
when the handover policy is a third handover policy:
the third handover policy is: when the first statistics value of the VoLTE traffic is greater than or equal to the limiting value of the VoLTE traffic, transmission of the VoLTE voice service and transmission of the VoLTE video service are both restricted; and
transmitting, by the modem, a VoLTE service according to the third handover policy comprises:
when the VoLTE service is the VoLTE voice service, performing, by the modem, a handover from an LTE network to a 2nd generation mobile communications technology 2G/3rd generation mobile communications technology 3G network, and transmitting collected voice data by using a circuit switched (CS) domain or a packet switched (PS) domain; and
when the VoLTE service is the VoLTE video service, switching, by the modem, a video mode to a voice mode, and transmitting collected voice data by using the CS domain or the PS domain.

7. The method according to claim 1, wherein: when the handover policy is a fourth handover policy: the fourth handover policy is: when the first statistics value of the VoLTE traffic is greater than or equal to the limiting value of the VoLTE traffic, reducing a codec rate of the VoLTE voice service, and reducing a transmission parameter of the VoLTE video service; and
transmitting, by the modem, a VoLTE service according to the fourth handover policy comprises: when the VoLTE service is the VoLTE voice service, reducing, by the modem, a codec rate of collected voice data; and when the VoLTE service is the VoLTE video service, reducing, by the modem, a transmission parameter of collected video data, wherein the transmission parameter of the video data comprises one or more of the following: resolution of image data in the video data, a frame rate of image data in the video data, or a codec rate of voice data in the video data.

8. A traffic statistics collection apparatus, comprising:
at least one processor configured to:
  when a first Internet Protocol (IP) packet is detected, obtain a first IP address of the first IP packet and a packet length of the first IP packet;
  obtain, from an in-memory database, an access point name (APN) corresponding to the first IP address of the first IP packet;
  when the APN corresponding to the first IP address of the first IP packet is an APN of a first public data network (PDN), add the packet length of the first IP packet to a first statistics value of voice over Long Term Evolution (VoLTE) traffic, wherein the first PDN is a PDN required by a bearer that establishes a VoLTE service;
  determine whether the first statistics value of the VoLTE traffic is greater than or equal to a limiting value of the VoLTE traffic;
  when the first statistics value of the VoLTE traffic is greater than or equal to the limiting value of the VoLTE traffic, transmit a VoLTE service according to a handover policy, wherein the VoLTE service is a VoLTE voice service or a VoLTE video service; and
  when the handover policy is a first handover policy:
    the first handover policy is: when the first statistics value of the VoLTE traffic is greater than or equal to the limiting value of the VoLTE traffic, transmission of the VoLTE voice service and transmission of the VoLTE video service are both unrestricted; and
    the at least one processor is configured to:
      when the VoLTE service is the VoLTE voice service, transmit collected voice data by using an LTE network; and
      when the VoLTE service is the VoLTE video service, transmit collected voice data and image data by using the LTE network.

9. The apparatus according to claim 8, wherein:
the at least one processor is further configured to obtain an IP address of the first PDN before the first Internet Protocol (IP) packet is detected; and
the apparatus further comprises:
  a memory configured to store the IP address of the first PDN that is obtained by the at least one processor and the APN of the first PDN corresponding to each other in the in-memory database;
  a transmitter configured to send a first PDN registration request to a network side, wherein the first PDN registration request comprises the APN of the first PDN, so that the network side obtains the IP address of the first PDN according to the APN of the first PDN; and
  a receiver configured to receive the IP address of the first PDN that is sent by the network side.

10. The apparatus according to claim 8, wherein the at least one processor is further configured to:
obtain a second statistics value of the VoLTE traffic that is obtained through statistics collection by an application processor AP; and
add the second statistics value of the VoLTE traffic to the first statistics value of the VoLTE traffic.

11. The apparatus according to claim 10, wherein:
the apparatus further comprises a receiver configured to receive the second statistics value of the VoLTE traffic that is sent by the AP; or
the at least one processor is configured to query traffic data obtained through statistics collection by the AP, to obtain the second statistics value of the VoLTE traffic.

12. The apparatus according to claim 8, further comprising: a receiver configured to: before the at least one processor transmits the VoLTE service according to the handover policy, receive the handover policy sent by an application processor (AP), wherein the handover policy is sent by the AP after the AP receives a selection trigger of a user for the handover policy.

13. The apparatus according to claim 8, wherein:
when the handover policy is a second handover policy:
the second handover policy is: when the first statistics value of the VoLTE traffic is greater than or equal to the limiting value of the VoLTE traffic, transmission of the VoLTE voice service is unrestricted, and transmission of the VoLTE video service is restricted; and
the at least one processor is configured to: when the VoLTE service is the VoLTE voice service, transmit collected voice data by using an LTE network; and when the VoLTE service is the VoLTE video service, switch a video mode to a voice mode, and transmit collected voice data by using the LTE network.

14. The apparatus according to claim 8, wherein:
when the handover policy is a third handover policy:
the third handover policy is: when the first statistics value of the VoLTE traffic is greater than or equal to the limiting value of the VoLTE traffic, transmission of the VoLTE voice service and transmission of the VoLTE video service are both restricted; and the at least one processor is configured to: when the VoLTE service is the VoLTE voice service, perform a handover from an LTE network to a 2nd generation mobile communications technology 2G/3rd generation mobile communications technology 3G network, and transmit collected voice data by using a circuit switched (CS) domain or a packet switched (PS) domain; and when the VoLTE service is the VoLTE video service, switch a video mode to a voice mode, and transmit collected voice data by using the CS domain or the PS domain.

15. The apparatus according to claim 8, wherein:
when the handover policy is a fourth handover policy:
the fourth handover policy is: when the first statistics value of the VoLTE traffic is greater than or equal to the limiting value of the VoLTE traffic, reducing a codec rate of the VoLTE voice service, and reducing a transmission parameter of the VoLTE video service; and
the at least one processor is configured to: when the VoLTE service is the VoLTE voice service, reduce a codec rate of collected voice data; and when the VoLTE service is the VoLTE video service, reduce a transmission parameter of collected video data, wherein the transmission parameter of the video data comprises one or more of the following: resolution of image data in the video data, a frame rate of image data in the video data, or a codec rate of voice data in the video data.

16. A terminal device, comprising:
a modem configured to:
  when a first Internet Protocol (IP) packet is detected, obtain a first IP address of the first IP packet and a packet length of the first IP packet,
  obtain, from an in-memory database, an access point name (APN) corresponding to the first IP address of the first IP packet;
  when the APN corresponding to the first IP address of the first IP packet is an APN of a first public data network (PDN), add the packet length of the first IP packet to a first statistics value of voice over Long Term Evolution (VoLTE) traffic, wherein the first PDN is a PDN required by a bearer that establishes a VoLTE service;

determine whether the first statistics value of the VoLTE traffic is greater than or equal to a limiting value of the VoLTE traffic;

when the first statistics value of the VoLTE traffic is greater than or equal to the limiting value of the VoLTE traffic, transmit a VoLTE service according to a handover policy, wherein the VoLTE service is a VoLTE voice service or a VoLTE video service and the handover policy is: when the first statistics value of the VoLTE traffic is greater than or equal to the limiting value of the VoLTE traffic, transmission of the VoLTE voice service and transmission of the VoLTE video service are both unrestricted; and wherein transmitting a VoLTE service according to the handover policy comprises:

when the VoLTE service is the VoLTE voice service, transmit collected voice data by using an LTE network; and when the VoLTE service is the VoLTE video service, transmit collected voice data and image data by using the LTE network; and an application processor (AP) configured to:

when a second IP packet is detected, obtain a second IP address of the second IP packet and a packet length of the second IP packet, obtain, from the in-memory database, an APN corresponding to the second IP address of the second IP packet; and when the APN corresponding to the second IP address of the second IP packet is an APN of the first PDN, add the packet length of the second IP packet to a second statistics value of the VoLTE traffic.

* * * * *

UNITED STATES PATENT AND TRADEMARK OFFICE
CERTIFICATE OF CORRECTION

PATENT NO. : 10,701,573 B2
APPLICATION NO. : 15/566395
DATED : June 30, 2020
INVENTOR(S) : Yinyuan Jia Page 1 of 1

It is certified that error appears in the above-identified patent and that said Letters Patent is hereby corrected as shown below:

In the Claims

In Column 41, Line 8, in Claim 1, after "a" insert -- first --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*